United States Patent
Nasu et al.

(10) Patent No.: US 11,292,308 B2
(45) Date of Patent: Apr. 5, 2022

(54) VEHICLE MOTION STATE ESTIMATION APPARATUS

(71) Applicant: HITACHI AUTOMOTIVE SYSTEMS, LTD., Hitachinaka (JP)

(72) Inventors: Shingo Nasu, Tokyo (JP); Junya Takahashi, Tokyo (JP); Nobuyuki Ichimaru, Hitachinaka (JP); Ryusuke Hirao, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 282 days.

(21) Appl. No.: 16/348,468

(22) PCT Filed: Nov. 22, 2017

(86) PCT No.: PCT/JP2017/041980
§ 371 (c)(1),
(2) Date: May 8, 2019

(87) PCT Pub. No.: WO2018/105399
PCT Pub. Date: Jun. 14, 2018

(65) Prior Publication Data
US 2019/0263210 A1  Aug. 29, 2019

(30) Foreign Application Priority Data
Dec. 9, 2016 (JP) .............................. JP2016-238944

(51) Int. Cl.
*B60G 17/018* (2006.01)
*G07C 5/08* (2006.01)
(Continued)

(52) U.S. Cl.
CPC ......... *B60G 17/018* (2013.01); *B60G 17/015* (2013.01); *B60W 40/10* (2013.01);
(Continued)

(58) Field of Classification Search
CPC ............... B60G 17/015; B60G 17/018; B60G 2400/106; B60G 2400/208;
(Continued)

(56) References Cited

U.S. PATENT DOCUMENTS 6,654,674 B2 * 11/2003 Lu ......................... B60T 8/1755
701/36
7,239,949 B2 * 7/2007 Lu ........................ B60G 17/018
280/5.502
(Continued)

FOREIGN PATENT DOCUMENTS

| CN | 104742680 A | 7/2015 |
| JP | H6-48139 A | 2/1994 |
| JP | 2015-051719 A | 3/2015 |

OTHER PUBLICATIONS

Office Action issued in corresponding Korean Patent Application No. 10-2019-7013333 dated Mar. 31, 2020.
Office Action issued in corresponding Chinese Patent Application No. 201780071172.X dated Sep. 18, 2021.

*Primary Examiner* — Hunter B Lonsberry
*Assistant Examiner* — Daniel L Greene
(74) *Attorney, Agent, or Firm* — Foley & Lardner LLP

(57) ABSTRACT

An object of the present invention is to provide a vehicle motion state estimation device capable of estimating a vertical momentum of a vehicle with high accuracy from a wheel speed sensor signal during traveling such as acceleration or deceleration, turning, or the like where wheel slips in longitudinal and lateral directions occur. The present invention estimates and removes a variation component caused by a wheel slip from variation components of a wheel speed sensor signal to extract a variation component caused by a displacement of a suspension, and estimates a vertical momentum of a vehicle from the extracted variation component caused by the displacement of the suspension.

10 Claims, 24 Drawing Sheets

(51) Int. Cl.
*B60W 40/11* (2012.01)
*B60G 17/015* (2006.01)
*B60W 40/10* (2012.01)

(52) U.S. Cl.
CPC ............... *B60W 40/11* (2013.01); *G07C 5/08* (2013.01); *B60G 2400/106* (2013.01); *B60G 2400/208* (2013.01); *B60G 2400/252* (2013.01); *B60G 2401/16* (2013.01); *B60G 2500/10* (2013.01); *B60G 2800/21* (2013.01); *B60G 2800/70* (2013.01)

(58) Field of Classification Search
CPC .......... B60G 2400/252; B60G 2401/16; B60G 2500/10; B60G 2800/21; B60G 2800/70; B60W 40/10; B60W 40/11; G07C 5/08
See application file for complete search history.

(56) References Cited

U.S. PATENT DOCUMENTS

| | | | |
|---|---|---|---|
| 7,489,995 B2* | 2/2009 | Yasui | B60T 8/172 |
| | | | 701/36 |
| 8,346,433 B2* | 1/2013 | Lu | B60T 8/17554 |
| | | | 701/36 |
| 8,649,938 B2* | 2/2014 | Matsumoto | B60W 30/02 |
| | | | 701/36 |
| 10,005,455 B2* | 6/2018 | Hulten | B60T 8/1755 |
| 2008/0059021 A1 | 3/2008 | Lu et al. | |
| 2008/0066991 A1* | 3/2008 | Kataoka | B62D 5/046 |
| | | | 180/443 |
| 2015/0183289 A1 | 7/2015 | Koumura | |

\* cited by examiner

1: WHEEL SPEED SENSOR
2: ACCELERATION SENSOR
3: GYRO SENSOR
4: STEERING ANGLE SENSOR
5: DRIVE CONTROL UNIT
6: BRAKE CONTROL UNIT
7: TIRE
10a: VEHICLE
50a, 50b: VEHICLE MOTION STATE ESTIMATION DEVICE

1: WHEEL SPEED SENSOR
2: ACCELERATION SENSOR
3: GYRO SENSOR
4: STEERING ANGLE SENSOR
5: DRIVE CONTROL UNIT
6: BRAKE CONTROL UNIT
7: TIRE
10b: VEHICLE
50a, 50b, 50c, 50d: VEHICLE MOTION STATE ESTIMATION DEVICE
81: SUSPENSION CONTROL UNIT
82: CONTROL SUSPENSION DEVICE

VEHICLE MOTION STATE ESTIMATION APPARATUS

TECHNICAL FIELD

The present invention relates to estimation of a motion state of a vehicle, for example, a vehicle motion state estimation device that estimates a vertical momentum.

BACKGROUND ART

Regarding a method for directly detecting a vertical momentum of a vehicle using an additional sensor such as a vehicle height sensor and a vertical acceleration sensor, for example, there is known a method for estimating a vertical momentum without any additional sensor using a wheel speed sensor or the like as described in PTL 1.

CITATION LIST

Patent Literature

PTL 1: JP H6-48139 A

SUMMARY OF INVENTION

Technical Problem

In the method for estimating the vertical momentum described in PTL 1, however, there is no consideration on a variation of wheel speed induced by wheel slips in longitudinal and lateral directions, caused depending on acceleration or deceleration, turning, or the like, and there is a possibility that the accuracy may significantly deteriorate.

The present invention is an invention configured to solve the above-described problem, and an object thereof is to provide a vehicle motion state estimation device capable of estimating a vertical momentum of a vehicle with high accuracy from a wheel speed sensor signal during traveling such as acceleration or deceleration, turning, or the like where wheel slips in longitudinal and lateral directions occur.

Solution to Problem

In order to achieve the above object, a vehicle motion state estimation device of the present invention estimates and removes a wheel slip-induced component from variation components of a wheel speed sensor signal to extract a suspension displacement-induced component caused by a displacement of a suspension, and estimates a vertical momentum of a vehicle from the suspension displacement-induced component.

Advantageous Effects of Invention

According to the present invention, it is possible to estimate a vehicle motion state with high accuracy regardless of the presence or absence of the wheel slip.

Another characteristic relating to the present invention will become apparent from the description of the present specification and the accompanying drawings. Further, other objects, configurations, and effects will be apparent from the following description of embodiments.

BRIEF DESCRIPTION OF DRAWINGS

FIG. 1 is a conceptual diagram of a vehicle motion state estimation device 50a.

DESCRIPTION OF EMBODIMENTS

Embodiments for carrying out the present invention will be described in detail with reference to the drawings as appropriate.

Prior to the description on the embodiments, a method for estimating a vertical momentum of a vehicle based on a detection value of a wheel speed sensor, an acceleration sensor, or the like will be described below with reference to FIGS. 1 to 3 so as to facilitate understanding of the present invention.

Figure 1:
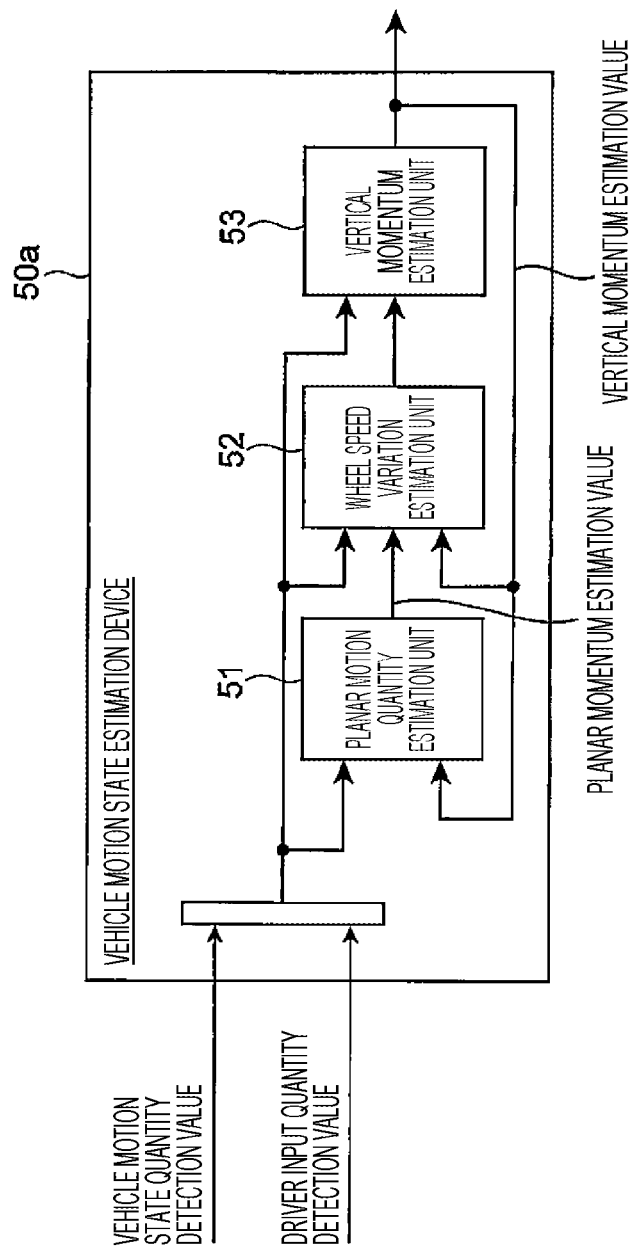

FIG. 1 is a conceptual diagram of a vehicle motion state estimation device 50a that estimates the vertical momentum such as a relative speed and a pitch rate based on the detection value of the wheel speed sensor, the acceleration sensor, or the like.

For example, a vehicle motion state quantity detection value detected by the wheel speed sensor, the acceleration sensor, or the like and a driver input quantity detection value detected by a steering angle sensor, a stroke sensor, or the like are input to the vehicle motion state estimation device 50a.

Then, a vertical momentum estimation value is output based on the input detection values. Here, the vehicle motion state quantity detection value is a value such as a wheel speed, and a longitudinal acceleration, a lateral acceleration, a yaw rate, or the like of a vehicle body. Further, the driver input quantity detection value is a value such as a steering angle, an accelerator opening degree, and a brake pedal force.

The vehicle motion state estimation device 50a includes a planar momentum estimation unit 51, a wheel speed variation estimation unit 52, and a vertical momentum estimation unit 53.

The planar momentum estimation unit 51 estimates a planar momentum of a vehicle such as a slip ratio, which is a wheel slip in the longitudinal direction of a tire, a side slip angle which is a wheel slip in the lateral direction, and a tire longitudinal force generated in the longitudinal direction of the tire using the vehicle motion state quantity detection value, the driver input quantity detection value, and the vertical momentum estimation value of the vertical momentum estimation unit 53, and outputs the estimated planar momentum as a planar momentum estimation value.

Here, the lateral direction of the tire is a direction perpendicular to a rotation surface of the tire (a rotation axis direction of the tire), and the longitudinal direction of the tire is a direction (a rolling direction of the tire) orthogonal to the lateral direction of the tire on an installation surface of the tire.

The wheel speed variation estimation unit 52 estimates a wheel slip-induced wheel speed variation caused by the wheel slip using the vehicle motion state quantity detection value, the driver input quantity detection value, the planar momentum estimation value of the planar momentum estimation unit 51, and the vertical momentum estimation value of the vertical momentum estimation unit 53, removes the estimated wheel slip-induced wheel speed variation from variation components of a signal of a wheel speed sensor 1 to extract a suspension displacement-induced wheel speed variation caused by a displacement of a suspension, and outputs the extracted suspension displacement-induced wheel speed variation as a wheel speed variation estimation value.

The vertical momentum estimation unit 53 estimates a vertical momentum of the vehicle such as a relative speed and a pitch rate using the vehicle motion state quantity detection value, the driver input quantity detection value, and the wheel speed variation estimation value of the wheel speed variation estimation unit 52, and outputs the estimated vertical momentum as the vertical momentum estimation value.

Since it is possible to extract only the suspension displacement-induced wheel speed variation even when the wheel slip occurs by using the vehicle motion state estimation device 50a having the above configuration, it is possible to estimate the vertical momentum with higher accuracy as compared with the related art.

Figure 2:
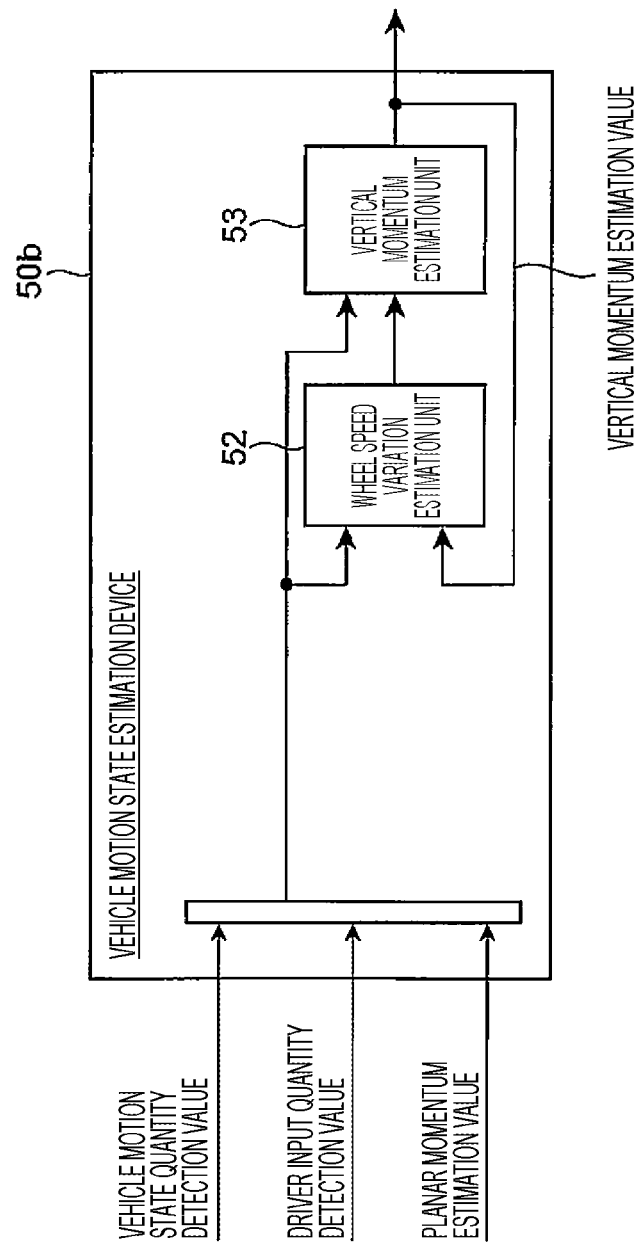
FIG. 2 is a conceptual diagram of a vehicle motion state estimation device 50b.

FIG. 2 is a conceptual diagram of a vehicle motion state estimation device 50b that estimates a vertical momentum such as a relative speed and a pitch rate based on detection values of a wheel speed sensor and an acceleration sensor, and a planar momentum estimation value such as a slip ratio and a tire longitudinal force.

A major difference between the vehicle motion state estimation device 50b of FIG. 2 and the vehicle motion state estimation device 50a of FIG. 1 is a change to a configuration in which the planar momentum estimation unit 51 is removed and a planar momentum estimation value, which is estimated by an external device such as a side slip prevention device (ESC) or ABS device separately mounted and connected to the vehicle, is input. In the configuration illustrated in FIG. 2, the planar momentum estimation value such as the slip ratio and the tire longitudinal force is estimated by the external device.

As some of the estimation values are substituted with the value estimated by the external device of the vehicle motion state estimation device in this manner, a calculation load of the vehicle motion state estimation device can be reduced, and it is possible to realize the estimation of the vehicle motion state with a less expensive computer.

A specific example of the method for estimating the vertical momentum in the vertical momentum estimation unit 53 will be described with reference to FIGS. 3 and 4.

Figure 3:
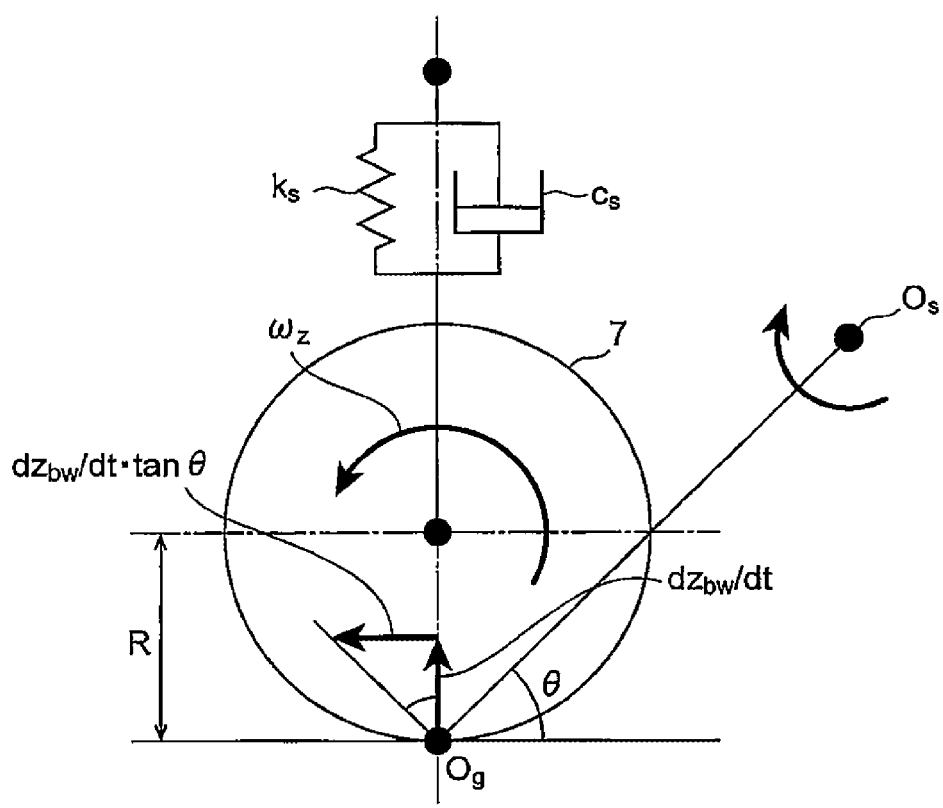
FIG. 3 is a diagram illustrating a geometrical relationship between a suspension displacement and a wheel speed variation.

FIG. 3 is a diagram illustrating a geometrical relationship between a suspension displacement and a wheel speed variation.

FIG. 3 illustrates a wheel speed variation which is a change in rotational speed of a tire 7 accompanying a displacement of the suspension as viewed from a traverse direction of the vehicle. The suspension displacement-induced wheel speed variation is denoted by $\omega_z$, a tire effective turning radius is denoted by R, an instantaneous rotation center of the suspension is denoted by $O_s$, a contact point between the tire 7 and a road surface is denoted by $O_g$, an angle formed between the road surface and a line connecting $O_s$ and $O_g$ is denoted by $\theta$, a spring constant of the suspension is denoted by $k_s$, a damping coefficient of the suspension is denoted by $c_s$, and a relative displacement between sprung and unsprung portions, which is the suspension displacement, is denoted by $z_{bw}$.

A relative speed $dz_{bw}/dt$, which is a time differential of a relative displacement $z_{bw}$, is expressed by the following Formula (1).

[Formula 1]

$$\frac{dz_{bw}}{dt} = -\frac{R\omega_z}{\tan\theta} \quad (1)$$

Here, Formula (1) is an example of a method for estimating the relative speed $dz_bw/dt$. A gain or a characteristic map that outputs the relative speed $dz_{bw}/dt$ may be used with an input of the suspension displacement-induced wheel speed variation $\omega_z$, and the method for estimating the relative speed $dz_{bw}/dt$ is not limited.

In the related art, a variation component of a wheel speed sensor signal itself is treated as the suspension displacement-induced wheel speed variation $\omega_z$ in Formula (1). However, this variation component of the wheel speed sensor signal contains not only the suspension displacement but also a variation component caused by a wheel slip, and thus, there is a problem that an estimation error increases when the wheel slip occurs.

In the present invention, however, the problem is solved by estimating the wheel slip-induced wheel speed variation from the wheel speed sensor signal and removing the estimated wheel slip-induced wheel speed variation from the variation components of the wheel speed sensor signal to extract the suspension displacement-induced wheel speed variation $\omega_z$.

Incidentally, specific examples of a method for estimating the wheel slip-induced wheel speed variation and the like will be described in the following first embodiment and the like.

An example of the method for estimating the relative speed $dz_{bw}/dt$ according to the present invention has been described as above. It is possible to estimate another vertical momentum such as a sprung vertical speed and a pitch rate using this estimation value of the relative speed.

Next, a method for estimating the vertical momentum such as the sprung vertical speed and the pitch rate from the estimated relative speed will be described with reference to FIGS. 4 and 5.

Figure 4:
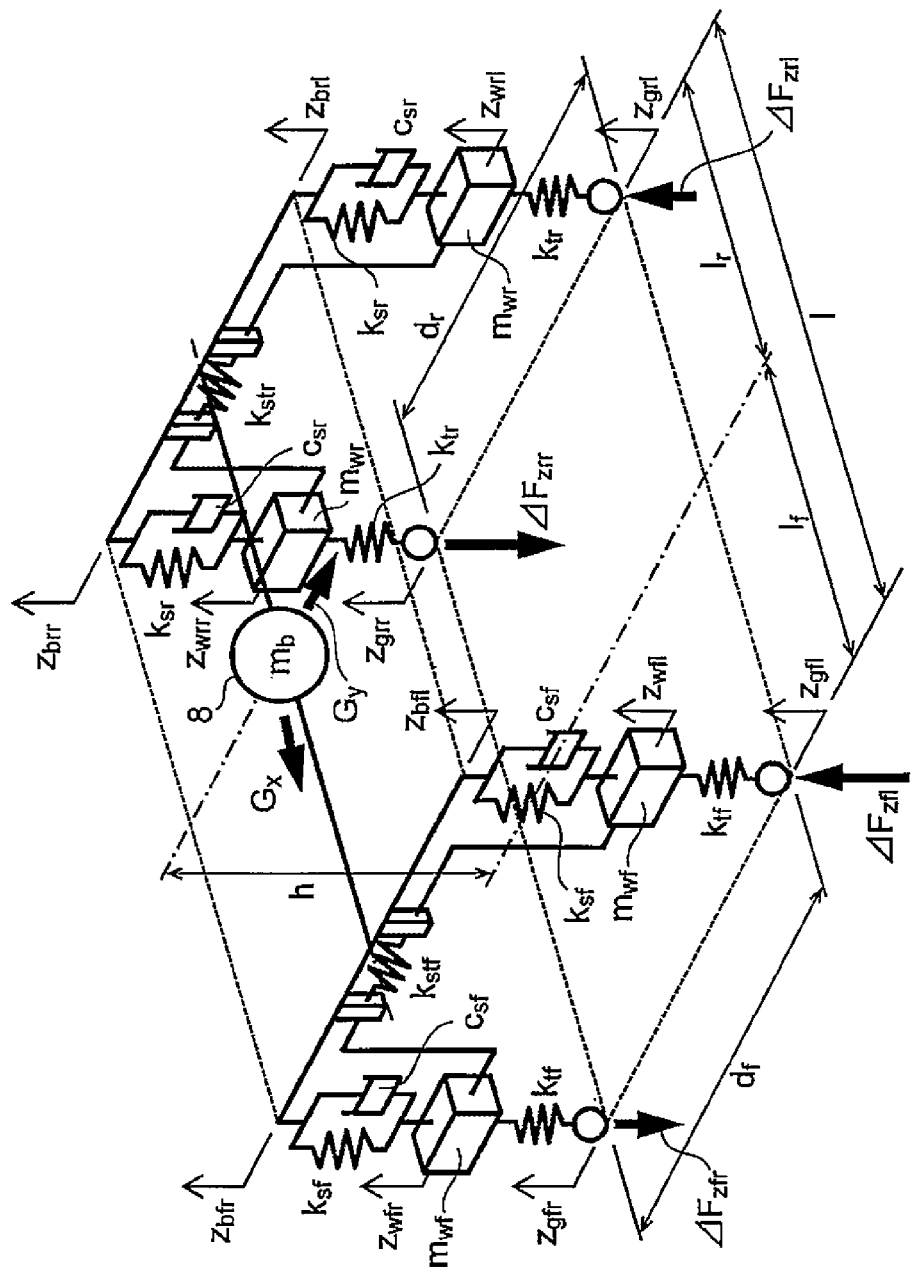
FIG. 4 is a diagram illustrating a four-wheel full vehicle model.

FIG. 4 is a diagram illustrating a four-wheel full vehicle model. In the present embodiment, a center of gravity 8 of the vehicle is set to the origin, the longitudinal direction of the vehicle is denoted by x, the traverse direction of the vehicle is denoted by y, and the vertical direction of the vehicle is denoted by z.

FIG. 4 illustrates a motions of a four-wheeled vehicle during acceleration or deceleration or turning, or when receiving an input of a road surface displacement.

Here, a longitudinal acceleration of the vehicle is denoted by $G_x$, a lateral acceleration, which is an acceleration in the traverse direction, of the vehicle is denoted by $G_y$, a sprung mass is $m_b$, unsprung masses of the front and rear suspensions are denoted by $m_{wf}$ and $m_{wr}$, spring constants are denoted by $k_{sf}$ and $k_{sr}$, damping coefficients are denoted by $c_{sf}$ and $c_{sr}$, spring constants of front and rear stabilizers are denoted by $k_{stf}$ and $k_{str}$, and vertical spring constants of front and rear tires are denoted by $k_{tf}$ and $k_{tr}$.

Further, sprung vertical displacements of the suspension on the front left, front right, rear left, and rear right sides are denoted by $z_{bfl}$, $z_{bfr}$, $z_{brl}$, and $z_{brr}$, unsprung vertical displacements are denoted by $z_{wfl}$, $z_{wfr}$, $z_{wrl}$, and $z_{wrr}$, road surface displacements are denoted by $z_{gfl}$, $z_{gfr}$, $z_{grl}$, and $z_{grr}$, and variations of tire vertical forces are denoted by $\Delta F_{zfl}$, $\Delta F_{zfr}$, $\Delta F_{zrl}$, and $\Delta F_{zrr}$.

Further, a height from the road surface of the center of gravity 8 on which the sprung mass $m_b$ acts is denoted by h, a distance between the center of gravity 8 and a front wheel shaft, and a distance between the center of gravity 8 and a rear wheel shaft are denoted by $l_f$ and $l_r$, a wheel base, which is a distance between the front wheel shaft and the rear wheel shaft, is denoted by l, and tread widths of the front and rear wheels of the vehicle are denoted by $d_f$ and $d_r$.

The vertical motion of the sprung portion is expressed by the following Formula (2) with a sprung vertical acceleration as $d^2 z_b/dt^2$.

[Formula 2]

$$m_b \frac{d^2 z_b}{dt^2} = F_{bwfl} + F_{bwfr} + F_{bwrl} + F_{bwrr} \quad (2)$$

Here, $F_{bwfr}$, $F_{bwfl}$, $F_{bwrr}$, and $F_{bwrl}$ are vertical forces acting on the sprung portion, and are expressed by the following Formula (3).

[Formula 3]

$$\begin{cases} F_{bwfl} = -k_{sf} z_{bwfl} - c_{sf} \frac{dz_{bwfl}}{dt} - k_{stf}(z_{bwfl} - z_{bwfr}) \\ F_{bwfr} = -k_{sf} z_{bwfr} - c_{sf} \frac{dz_{bwfr}}{dt} + k_{stf}(z_{bwfl} - z_{bwfr}) \\ F_{bwrl} = -k_{sr} z_{bwrl} - c_{sr} \frac{dz_{bwrl}}{dt} - k_{str}(z_{bwrl} - z_{bwrr}) \\ F_{bwrr} = -k_{sr} z_{bwrr} - c_{sr} \frac{dz_{bwrr}}{dt} + k_{str}(z_{bwrl} - z_{bwrr}) \end{cases} \quad (3)$$

Here, $z_{bwfl}$, $z_{bwfr}$, $z_{bwrl}$, and $z_{bwrr}$ are relative displacements of the sprung and unsprung portions, and are expressed by the following Formula (4).

Incidentally, $dz_{bwfl}/dt$, $dz_{bwfr}/dt$, $dz_{bwrl}/dt$, and $dz_{bwrr}/dt$ are relative speeds of the sprung and unsprung portions, which are time differentials of the relative displacements $z_{bwfl}$, $z_{bwfr}$, $z_{bwrl}$, and $z_{bwrr}$.

Further, the relative displacements $z_{bwfl}$, $z_{bwfr}$, $z_{bwrl}$, and $z_{bwrr}$ are calculated by time-integration of the relative speeds $dz_{bwfl}/dt$, $dz_{bwfr}/dt$, $dz_{bwrl}/dt$, and $dz_{bwrr}/dt$ estimated using Formula (1), respectively.

[Formula 4]

$$\begin{cases} z_{bwfl} = z_{bfl} - z_{wfl} \\ z_{bwfr} = z_{bfr} - z_{wfr} \\ z_{bwrl} = z_{brl} - z_{wrl} \\ z_{bwrr} = z_{brr} - z_{wrr} \end{cases} \quad (4)$$

Next, the unsprung vertical motions in the suspension on the front left, front right, rear left, and rear right sides are expressed by the following Formula (5) with unsprung vertical accelerations as $d^2 z_{wfl}/dt^2$, $d^2 z_{wfr}/dt^2$, $d^2 z_{wrl}/dt^2$, and $d^2 z_{wrr}/dt^2$.

[Formula 5]

$$\begin{cases} m_{wf} \frac{d^2 z_{wfl}}{dt^2} = -k_{tf}(z_{wfl} - z_{gfl}) - F_{bwfl} \\ m_{wf} \frac{d^2 z_{wfr}}{dt^2} = -k_{tf}(z_{wfr} - z_{gfr}) - F_{bwfr} \\ m_{wr} \frac{d^2 z_{wrl}}{dt^2} = -k_{tr}(z_{wrl} - z_{grl}) - F_{bwrl} \\ m_{wr} \frac{d^2 z_{wrr}}{dt^2} = -k_{tr}(z_{wrr} - z_{grr}) - F_{bwrr} \end{cases} \quad (5)$$

Next, the variations $\Delta F_{zfl}$, $\Delta F_{zfr}$, $\Delta F_{zrl}$, and $\Delta F_{zrr}$ of the vertical forces of the front left, front right, rear left, and rear right tires are expressed by the following Formula (6) using Formula (5).

Furthermore, an unsprung mass of a general vehicle, which is a target of the present invention, is extremely small relative to a sprung mass. Thus, the unsprung vertical accelerations $d^2z_{wfl}/dt^2$, $d^2z_{wfr}/dt^2$, $d^2z_{wrl}/dt^2$, and $d^2z_{wrr}/dt^2$ are dominant in relative accelerations $d^2z_{bwfl}/dt^2$, $d^2z_{bwfr}/dt^2$, $d^2z_{bwrl}/dt^2$, and $d^2z_{bwrr}/dt^2$ between the sprung and unsprung portions, which are time differentials of the relative speeds $dz_{bwfl}/dt$, $dz_{bwfr}/dt$, $dz_{bwrl}/dt$, and $dz_{bwrr}/dt$, and the variations $\Delta F_{zfl}$, $\Delta F_{zfr}$, $\Delta F_{zrl}$, and $\Delta F_{zrr}$ can be approximated as the following Formula (6).

[Formula 6]

$$\begin{cases} \Delta F_{zfl} = -k_{tf}(z_{wfl} - z_{gfl}) = m_{wf}\frac{d^2z_{wfl}}{dt^2} + F_{bwfl} \approx -m_{wf}\frac{d^2z_{bwfl}}{dt^2} + F_{bwfl} \\ \Delta F_{zfr} = -k_{tf}(z_{wfr} - z_{gfr}) = m_{wf}\frac{d^2z_{wfr}}{dt^2} + F_{bwfr} \approx -m_{wf}\frac{d^2z_{bwfr}}{dt^2} + F_{bwfr} \\ \Delta F_{zrl} = -k_{tr}(z_{wrl} - z_{grl}) = m_{wr}\frac{d^2z_{wrl}}{dt^2} + F_{bwrl} \approx -m_{wr}\frac{d^2z_{bwrl}}{dt^2} + F_{bwrl} \\ \Delta F_{zrr} = -k_{tr}(z_{wrr} - z_{grr}) = m_{wr}\frac{d^2z_{wrr}}{dt^2} + F_{bwrr} \approx -m_{wr}\frac{d^2z_{bwrr}}{dt^2} + F_{bwrr} \end{cases} \quad (6)$$

Here, $d^2z_{bwfl}/dt^2$, $d^2z_{bwfr}/dt^2$, $d^2z_{bwrl}/dt^2$, and $d^2z_{bwrr}/dt^2$ are the relative accelerations between the sprung and unsprung portions which are the time differentials of the relative speeds $dz_{bwfl}/dt$, $dz_{bwfr}/dt$, $dz_{bwrl}/dt$, and $dz_{bwrr}/dt$.

Further, the vertical forces $F_{zfl}$, $F_{zfr}$, $F_{zrl}$, and $F_{zrr}$ of the front left, front right, rear left, and rear right tires are expressed by the following Formula (7) using the variations of the tire vertical forces represented by Formula (6) with vertical forces of the front left, front right, rear left, and rear right tires at rest as $F_{z0fl}$, $F_{z0fr}$, $F_{z0rl}$, and $F_{z0rr}$.

[Formula 7]

$$\begin{cases} F_{zfl} = F_{z0fl} + \Delta F_{zfl} \\ F_{zfr} = F_{z0fr} + \Delta F_{zfr} \\ F_{zrl} = F_{z0rl} + \Delta F_{zrl} \\ F_{zrr} = F_{z0rr} + \Delta F_{zrr} \end{cases} \quad (7)$$

Figure 5:
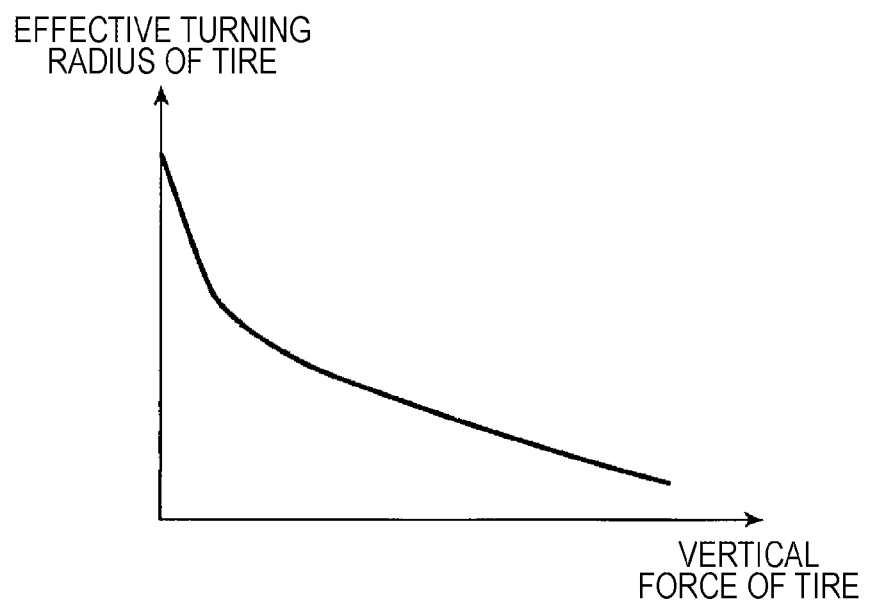
FIG. 5 is a graph illustrating a relationship between a tire vertical force and a tire effective turning radius.

FIG. 5 is a graph illustrating a relationship between the tire vertical force and a tire effective turning radius.

As the vertical forces $F_{zfl}$, $F_{zfr}$, $F_{zrl}$, and $F_{zrr}$ of the front left, front right, rear left, and rear right tires estimated using Formula (7) are input to the characteristic map illustrated in FIG. 5, it is possible to estimate effective turning radiuses $R_{fl}$, $R_{fr}$, $R_{rl}$, and $R_{rr}$ of the front left, front right, rear left, and rear right tires.

Incidentally, this method is an example of a method for estimating the tire effective turning radius. An approximate expression or a gain of the characteristic illustrated in FIG. 5 may be used, and the method for estimating the tire effective turning radius is not limited.

Next, the sprung vertical speed $dz_b/dt$, a pitch rate $d\theta_y/dt$, and a roll rate $d\theta_x/dt$ are expressed by the following Formulas (8) to (10) with a pitch moment of inertia of the vehicle body as $I_y$, and a roll moment of inertia as $I_x$.

[Formula 8]

$$\frac{dz_b}{dt} = \int \frac{F_{bwfl} + F_{bwfr} + F_{bwrl} + F_{bwrr}}{m_b} dt \quad (8)$$

[Formula 9]

$$\frac{d\theta_y}{dt} = \int \frac{l_f(F_{bwfl} + F_{bwfr}) - l_r(F_{bwrl} + F_{bwrr})}{I_y} dt \quad (9)$$

[Formula 10]

$$\frac{d\theta_x}{dt} = \int \frac{d_f(F_{bwfl} - F_{bwfr}) + d_r(F_{bwrl} - F_{bwrr})}{I_x} dt \quad (10)$$

The above method is an example of the method for estimating the vertical momentum of the vehicle in the present invention.

First Embodiment

An overview of processing performed by the vehicle motion state estimation devices 50*a* and 50*b* according to the first embodiment will be described with reference to FIGS. 6 to 15.

Figure 6:
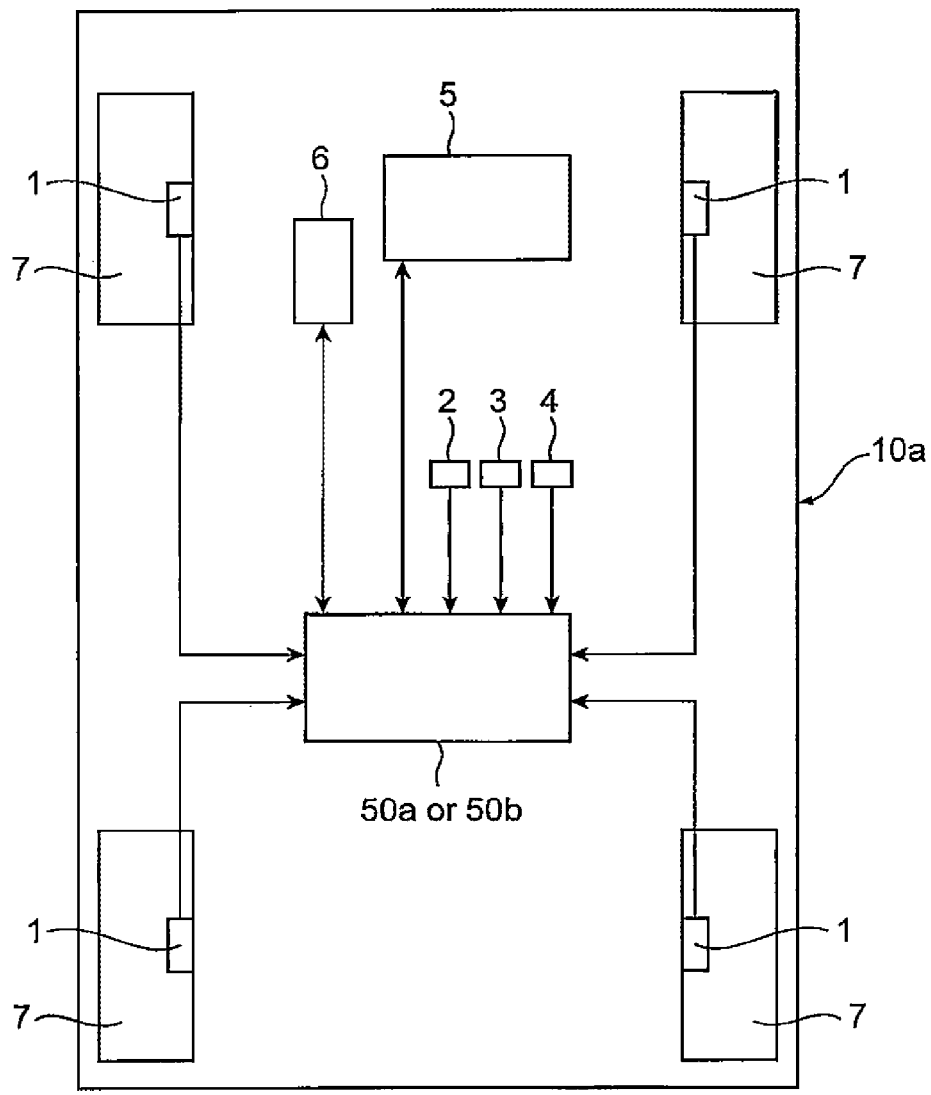
FIG. 6 is a diagram illustrating a vehicle configuration on which a vehicle motion state estimation device 50a or 50b is mounted according to a first embodiment.

FIG. 6 illustrates a configuration diagram of a vehicle 10*a* in which the vehicle motion state estimation device 50*a* or 50*b* is applied to a vehicle that controls a vehicle motion by a braking or driving force.

The vehicle motion state estimation device 50*a* or 50*b* of the present embodiment is mounted to the vehicle 10*a*, and acquires state quantities related to the vehicle motion from the wheel speed sensor 1, an acceleration sensor 2, a gyro sensor 3, a drive control unit 5, and a brake control unit 6 and a detection value of a state quantity related to a driver operation from a steering angle sensor 4.

Here, the drive control unit 5 is a unit that transmits a braking or driving torque, generated by an internal combustion engine or an electric motor based on the driver operation or a command from a controller, to the tire via a transmission, a differential gear, or the like to generate a braking or driving force on the tire.

Further, the brake control unit 6 is a unit that transmits hydraulic pressure generated by a master cylinder, a pump, or the like to each wheel based on the driver operation or the command from the controller, and operates a brake caliper provided for each wheel to generate a braking force on the tire.

As described in FIG. 1 or 2, the vehicle motion state estimation device 50*a* or 50*b* estimates a wheel slip-induced wheel speed variation using a detection value or an estimation value, and removes the estimated wheel slip-induced wheel speed variation from variation components of a wheel speed sensor signal to extract a suspension displacement-induced wheel speed variation, estimates a vertical momentum such as a sprung vertical speed and a pitch rate, and outputs a result thereof to the drive control unit 5 or the brake control unit 6, or both the drive control unit 5 and the brake control unit 6.

Here, for example, a value estimated by a side slip prevention device, which is one of devices constituting the brake control unit 6, an automatic driving control device (not illustrated), or the like is acquired and used as a planar momentum estimation value input to the vehicle motion state estimation device 50*b*.

First, an example of a method for estimating the planar momentum in the planar momentum estimation unit 51 will be described.

Figure 7:
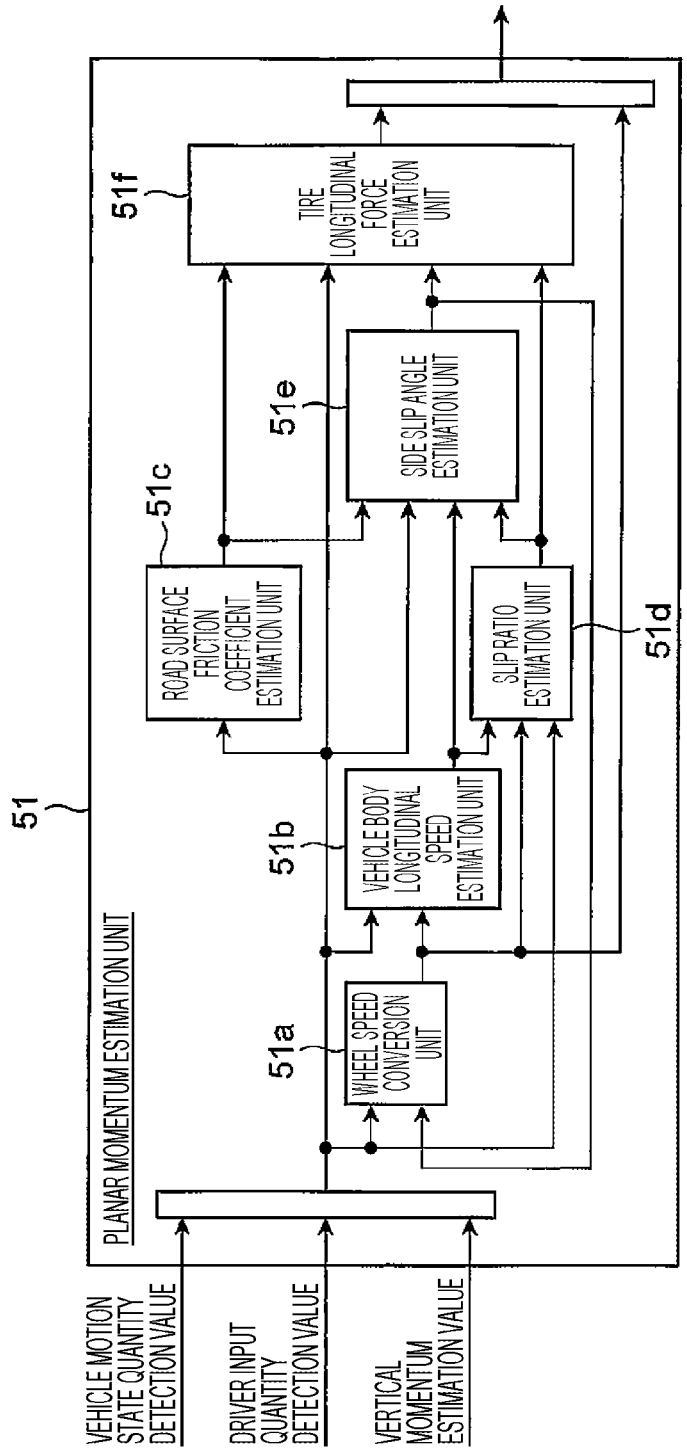
FIG. 7 is a conceptual diagram of a planar momentum estimation unit 51.

FIG. 7 is a conceptual diagram of the planar momentum estimation unit 51, which is one of estimation units constituting the vehicle motion state estimation device 50*a*.

As described in FIG. 1, the planar momentum estimation unit 51 estimates the planar momentum such as the slip ratio which is a wheel slip in the longitudinal direction, the side slip angle which is a wheel slip in the lateral direction, and the tire longitudinal force generated in the longitudinal direction of the tire using the vehicle motion state quantity detection value and the driver input quantity detection value, which are detection values of the wheel speed sensor, the acceleration sensor, and the like and the vertical momentum estimation value, which is the estimation value of the vertical momentum estimation unit 53, and outputs the estimated planar momentum.

The planar momentum estimation unit 51 includes: a wheel speed conversion unit 51a, a vehicle body longitudinal speed estimation unit 51b, a road surface friction coefficient estimation unit 51c, a slip ratio estimation unit 51d, a side slip angle estimation unit 51e, and a tire longitudinal force estimation unit 51f.

The wheel speed conversion unit 51a estimates and outputs a wheel speed conversion value, which is a value obtained by converting a signal of the wheel speed sensor 1 into a speed in the longitudinal direction of the center of gravity 8 of the vehicle using the vehicle motion state quantity detection value, the driver input quantity detection value, the vertical momentum estimation value, and a side slip angle estimation value of the side slip angle estimation unit 51e.

Front left, front right, rear left, and rear right wheel speed conversion values $V_{xfl}$, $V_{xfr}$, $V_{xrl}$, and $V_{xrr}$ are expressed by the following Formula (11) with an actual steering angle as $\delta$, a yaw rate as $r$, front left, front right, rear left, and rear right wheel rotational speeds as $\omega_{fl}$, $\omega_{fr}$, $\omega_{rl}$, and $\omega_{rr}$, tire effective turning radiuses as $R_{fl}$, $R_{fr}$, $R_{rl}$, and $R_{rr}$, and tire side slip angles as $\beta_{fl}$, $\beta_{fr}$, $\beta_{rl}$, and $\beta_{rr}$.

[Formula 11]

$$\begin{cases} V_{xfl} = \dfrac{R_{fl}\omega_{fl}}{\cos\beta_{fl}}\cos(\beta_{fl}+\delta) + \dfrac{d_f}{2}r \\ V_{xfr} = \dfrac{R_{fr}\omega_{fr}}{\cos\beta_{fr}}\cos(\beta_{fr}+\delta) - \dfrac{d_f}{2}r \\ V_{xrl} = R_{rl}\omega_{rl} + \dfrac{d_r}{2}r \\ V_{xrr} = R_{rr}\omega_{rr} - \dfrac{d_r}{2}r \end{cases} \quad (11)$$

Next, the vehicle body longitudinal speed estimation unit 51b estimates and outputs a vehicle body longitudinal speed, which is speed in the longitudinal direction of the center of gravity 8 of the vehicle, using the vehicle motion state quantity detection value, the driver input quantity detection value, the vertical momentum estimation value, and the estimation value of the wheel speed conversion unit 51a.

A vehicle body longitudinal speed $V_x$ is expressed by the following Formulas (12) and (13).

[Formula 12]

When $G_x \geq 0$, $V_x = \min\lfloor V_{xfl}, V_{xfr}, V_{xrl}, V_{xrr} \rfloor$ \quad (12)

[Formula 13]

When $G_x < 0$, $V_x = \max\lfloor V_{xfl}, V_{xfr}, V_{xrl}, V_{xrr} \rfloor$ \quad (13)

Here, Formulas (12) and (13) are an example of a method for estimating the vehicle body longitudinal speed Vx. A value estimated by time-differentiation of position information detected using a GPS may be used, and the method for estimating the vehicle body longitudinal speed $V_x$ is not limited to the above method.

Next, the road surface friction coefficient estimation unit 51c estimates and outputs a road surface friction coefficient using the vehicle motion state quantity detection value, the driver input quantity detection value, and the vertical momentum estimation value. A road surface friction coefficient $\mu$ is expressed by the following Formula (14).

[Formula 14]

$$\mu = \sqrt{G_x^2 + G_y^2} \quad (14)$$

Next, the slip ratio estimation unit 51d estimates and outputs the slip ratio, which is the slip in the longitudinal direction of the wheel, using the vehicle motion state quantity detection value, the driver input quantity detection value, the vertical momentum estimation value, and the estimation values of the wheel speed conversion unit 51a and the vehicle body longitudinal speed estimation unit 51b.

Front left, front right, rear left, and rear right slip ratios $\lambda_{fl}$, $\lambda_{fr}$, $\lambda_{rl}$, and $\lambda_{rr}$ are expressed by the following Formulas (15) and (16).

[Formula 15]

$$\text{When } G_x > 0, \begin{cases} \lambda_{fl} = \dfrac{V_x - V_{xfl}}{V_{xfl}} \\ \lambda_{fr} = \dfrac{V_x - V_{xfr}}{V_{xfr}} \\ \lambda_{rl} = \dfrac{V_x - V_{xrl}}{V_{xrl}} \\ \lambda_{rr} = \dfrac{V_x - V_{xrr}}{V_{xrr}} \end{cases} \quad (15)$$

[Formula 16]

$$\text{When } G_x < 0, \begin{cases} \lambda_{fl} = \dfrac{V_x - V_{xfl}}{V_x} \\ \lambda_{fr} = \dfrac{V_x - V_{xfr}}{V_x} \\ \lambda_{rl} = \dfrac{V_x - V_{xrl}}{V_x} \\ \lambda_{rr} = \dfrac{V_x - V_{xrr}}{V_x} \end{cases} \quad (16)$$

Next, the side slip angle estimation unit 51e estimates and outputs the side slip angle which is the slip in the lateral direction of the wheel using the vehicle motion state quantity detection value, the driver input quantity detection value, the vertical momentum estimation value, and the estimation values of the vehicle body longitudinal speed estimation unit 51b, the road surface friction coefficient estimation unit 51c, and the slip ratio estimation unit 51d.

Figure 8:
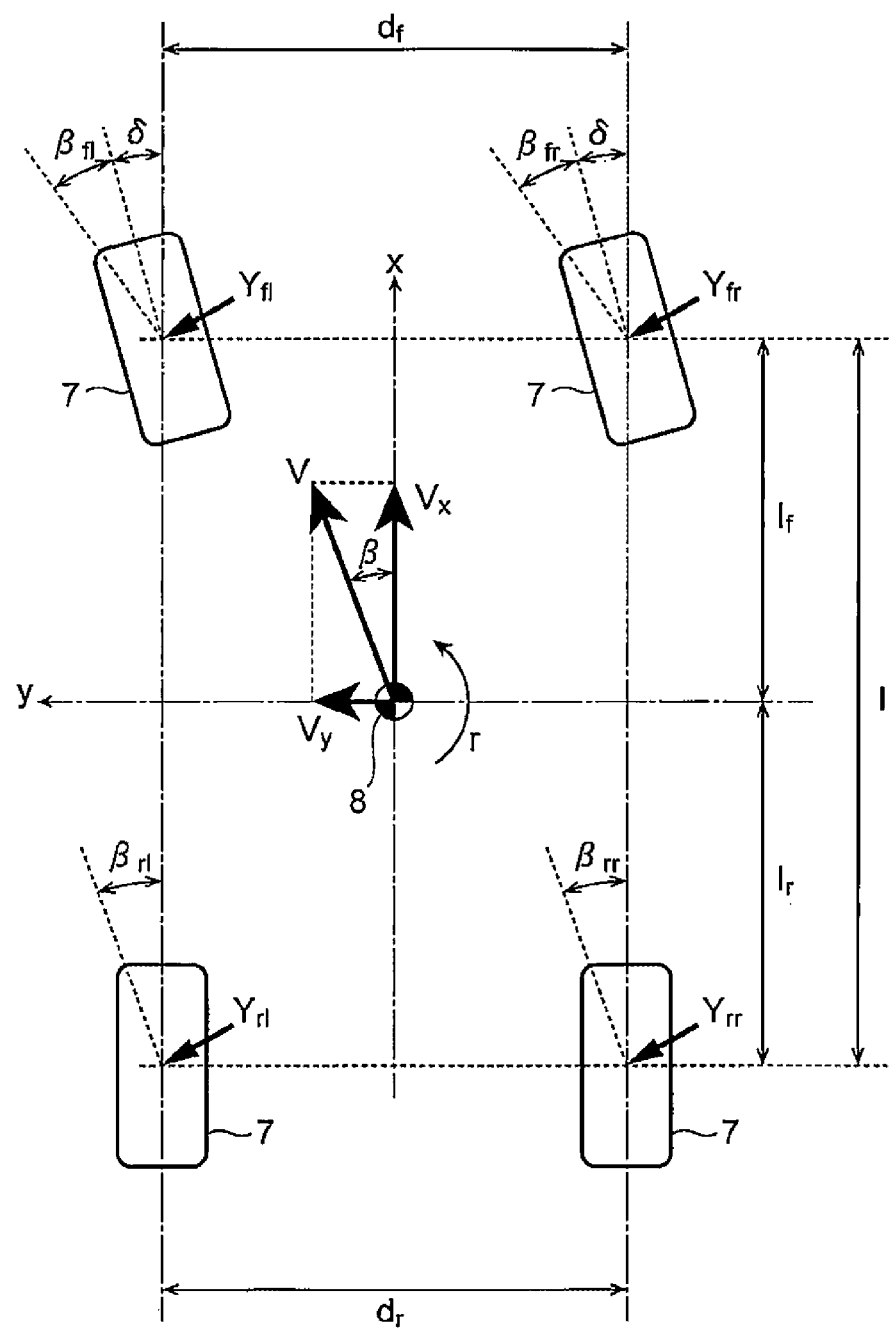
FIG. 8 is a diagram illustrating a plane model of a four-wheeled vehicle according to the first embodiment.

FIG. 8 is a diagram illustrating a four-wheeled vehicle model.

FIG. 8 illustrates a motion of a four-wheeled vehicle during turning, and the actual steering angle is denoted by $\delta$, a speed in a traveling direction of the vehicle is denoted by V, a speed in the traverse direction of the vehicle is denoted by $V_y$, a side slip angle between the traveling direction occurring in the vehicle turning at the speed V and the longitudinal direction of the vehicle body is denoted by $\beta$, and cornering forces acting on front left, front right, rear left, and rear right tires are denoted by $Y_{fl}$, $Y_{fr}$, $Y_{rl}$, and $Y_{rr}$.

Figure 9:
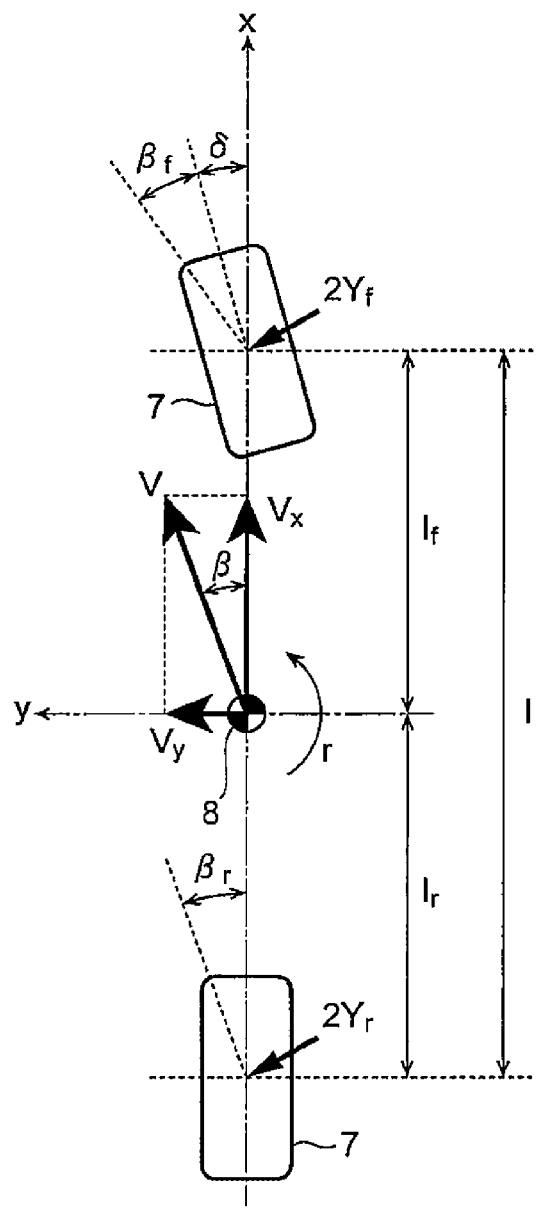
FIG. 9 is a diagram illustrating a plane model of a two-wheeled vehicle equivalent to the four-wheeled vehicle according to the first embodiment.

FIG. 9 is a diagram illustrating a two-wheeled vehicle model equivalent to a four-wheeled vehicle.

FIG. 9 is obtained by replacing FIG. 8 with a model in which right and left wheels on the front and rear sides are concentrated on intersections between front and rear wheel shafts and an axle while ignoring a tread of the vehicle in a range where it is regarded that the side slip angle of the right and left tires is small, its value is small, and an actual steering angle is also small.

Here, cornering forces $2Y_f$ and $2Y_r$ are resultant forces of cornering forces which act on the right and left of the front and rear tires illustrated in FIG. 9.

Here, a method for estimating side slip angles $\beta_{fl}$, $\beta_{fr}$, $\beta_{rl}$, and $\beta_{rr}$ of the front left, front right, rear left, and rear right tires using the two-wheeled vehicle model equivalent to the four-wheeled vehicle illustrated in FIG. 9 will be described as an example of the side slip angle estimation in the side slip angle estimation unit 51e.

First, $dV_y/dt$ which is a time differential of the lateral speed $V_y$ and $dr/dt$ which is a time differential of the yaw rate r occurring around the z-axis are expressed by the following Formulas (17) and (18) with a mass of the vehicle as m, cornering powers, which are cornering forces per unit side slip angle of the front and rear tires as $K_f$ and $K_r$, and a yaw moment of inertia of the vehicle as $I_z$.

[Formula 17]

$$\frac{dV_y}{dt} = -\frac{2(K_f + K_r)}{mV_x}V_y - \left\{V_x + \frac{2(l_f K_f - l_r K_r)}{mV_x}\right\}r + \frac{2K_f}{m}\delta \quad (17)$$

[Formula 18]

$$\frac{dr}{dt} = -\frac{2(l_f K_f - l_r K_r)}{I_z V_x}V_y - \frac{2(l_f^2 K_f + l_r^2 K_r)}{I_z V_x}r + \frac{2l_f K_f}{I_z}\delta \quad (18)$$

Further, an observer that feeds back an output deviation of the yaw rate r is configured, and Formulas (17) and (18) are expressed by a state equation and an output equation, thereby obtaining the following Formulas (19) and (20).

[Formula 19]

$$\frac{d}{dt}\begin{pmatrix}\hat{V}_y \\ \hat{r}\end{pmatrix} = \begin{bmatrix}a_{11} & a_{12} \\ a_{21} & a_{22}\end{bmatrix}\begin{pmatrix}\hat{V}_y \\ \hat{r}\end{pmatrix} + \begin{bmatrix}b_{11} \\ b_{21}\end{bmatrix}\delta + \begin{bmatrix}h_{11} \\ h_{12}\end{bmatrix}e \quad (19)$$

[Formula 20]

$$e = r - \hat{r} \quad (20)$$

wherein $a_{11} = -\frac{2(K_f + K_r)}{mV_x}$, $a_{12} = -\left\{V_x + \frac{2(l_f K_f - l_r K_r)}{mV_x}\right\}$, $b_{11} = \frac{2K_f}{m}$ $a_{21} = -\frac{2(l_f K_f - l_r K_r)}{I_z V_x}$, $a_{22} = -\frac{2(l_f^2 K_f + l_r^2 K_r)}{I_z V_x}$, $b_{21} = \frac{2l_f K_f}{I_z}$, and $(\hat{V}_y, \hat{r})$ is an estimation value of $(V_y, r)$.

In the observer, an observer input is corrected such that a deviation e decreases, and an estimation error of a state quantity is reduced. An estimation value $\hat{V}_y$ of the lateral speed is obtained from these Formulas (19) and (20), and an estimation value $\hat{\beta}$ of the side slip angle of the vehicle body is expressed by the following Formula (21).

[Formula 21]

$$\hat{\beta} = \frac{\hat{V}_y}{V_x} \quad (21)$$

Further, side slip angles $\beta_{fl}$, $\beta_{fr}$, $\beta_{rl}$, and $\beta_{rr}$ of the front left, front right, rear left, and rear right tires are expressed by the following Formula (22).

[Formula 22]

$$\begin{cases}\beta_{fl} = \beta_{fr} = \hat{\beta} + \frac{l_f r}{V} - \delta \\ \beta_{rl} = \beta_{rr} = \hat{\beta} + \frac{l_r r}{V} - \delta\end{cases} \quad (22)$$

Next, the tire longitudinal force estimation unit 51f estimates and outputs the tire longitudinal force, which is the force generated in the longitudinal direction of the tire using the vehicle motion state quantity detection value, the driver input quantity detection value, the vertical momentum estimation value, and the estimation values of the road surface friction coefficient estimation unit 51c, the slip ratio estimation unit 51d, and the side slip angle estimation unit 51e. The tire longitudinal force is estimated based on the road surface friction coefficient, the wheel slip, and the tire vertical force estimated from detection values from in-vehicle sensors.

Figure 10:
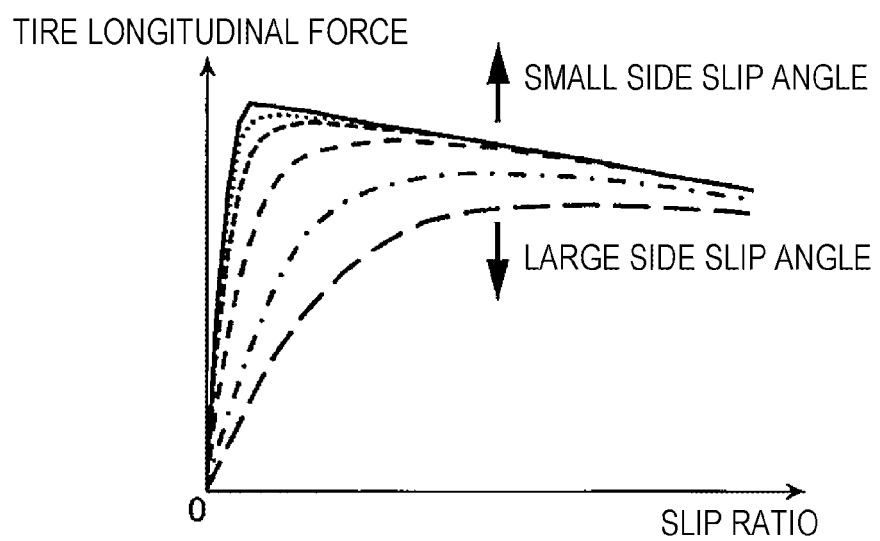
FIG. 10 is a graph illustrating a relationship between a wheel slip ratio and a tire longitudinal force according to the first embodiment.

FIG. 10 is a graph illustrating a relationship between a wheel slip and a tire longitudinal force when the road surface friction coefficient μ is 1.0 and a predetermined tire vertical force acts.

The tire longitudinal force estimation unit 51f has a plurality of characteristic maps as illustrated in FIG. 10 for each tire vertical force.

A value, output by inputting the tire vertical force, the slip ratio, and the side slip angle to the characteristic map, is multiplied by the road surface friction coefficient to estimate front left, front right, rear left, and rear right tire longitudinal forces $F_{xfl}$, $F_{xfr}$, $F_{xrl}$, and $F_{xrr}$.

Incidentally, this method is an example of a method for estimating the tire longitudinal force. An approximate expression or a gain of the characteristic illustrated in FIG. 10 may be used, and the method for estimating the tire longitudinal force is not limited.

The above method is an example of the method for estimating the planar momentum such as the wheel slip and the tire longitudinal force of the planar momentum estimation unit 51 according to the first embodiment.

Next, an example of a method for estimating a wheel speed variation in the wheel speed variation estimation unit 52 will be described.

Figure 11:
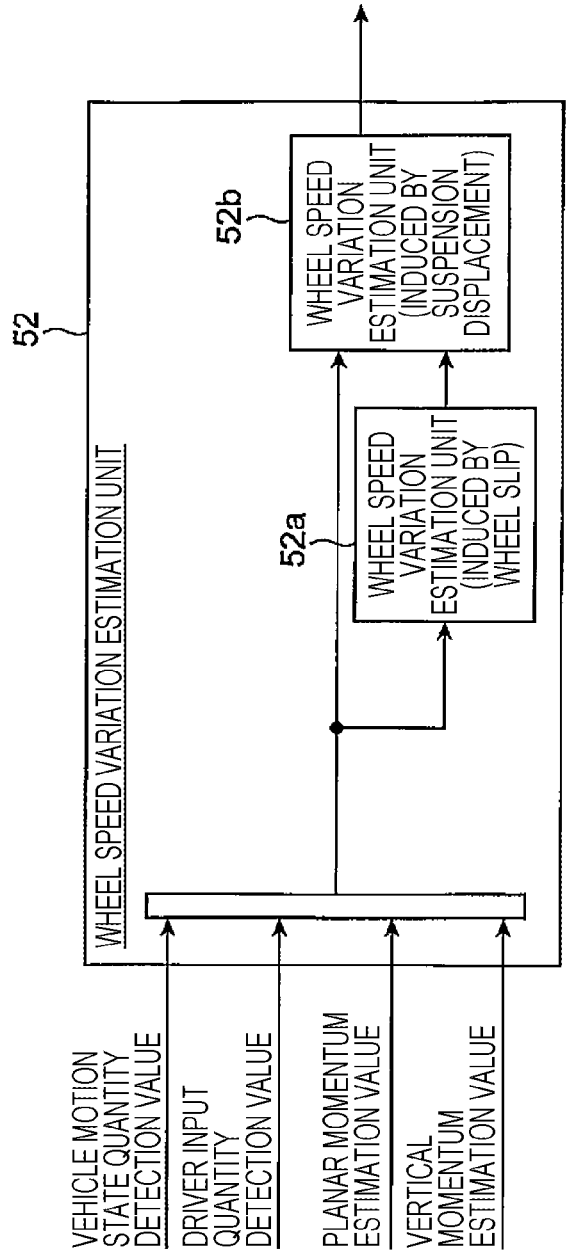
FIG. 11 is a conceptual diagram of a wheel speed variation estimation unit 52 according to the first embodiment.

FIG. 11 is a conceptual diagram of the wheel speed variation estimation unit 52, which is one of the estimation units constituting the vehicle motion state estimation device 50a or 50b.

The wheel speed variation estimation unit 52 estimates the wheel slip-induced wheel speed variation caused by the wheel slip using the vehicle motion state quantity detection value and the driver input quantity detection value, which are the detection values of the wheel speed sensor and the acceleration sensor, the estimation value of the planar momentum estimation unit 51 or the planar momentum estimation value estimated by the side slip prevention device or the like, and the vertical momentum estimation value, which is the estimation value of the vertical momentum estimation unit 53 as described in FIGS. 1 and 2, removes the estimated wheel slip-induced wheel speed variation from the variation components of the signal of the wheel speed sensor 1, thereby extracting and outputting the suspension displacement-induced wheel speed variation caused by the suspension displacement.

The wheel speed variation estimation unit 52 includes a wheel speed variation estimation unit (induced by a wheel slip) 52*a* and a wheel speed variation estimation unit (induced by a suspension displacement) 52*b*.

The wheel speed variation estimation unit (induced by the wheel slip) 52*a* estimates and outputs the wheel slip-induced wheel speed variation caused by the wheel slip using the vehicle motion state quantity detection value, the driver input quantity detection value, the planar momentum estimation value, and the vertical momentum estimation value.

Figure 12:
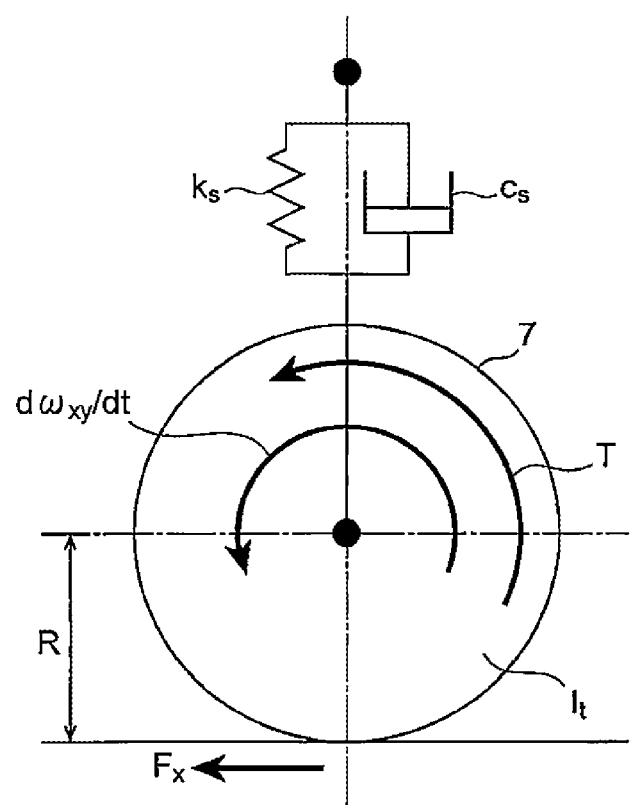
FIG. 12 is a diagram illustrating a motion of a tire in the longitudinal direction accompanying acceleration or deceleration according to the first embodiment.

FIG. 12 is a diagram illustrating a motion of the tire in the longitudinal direction accompanying acceleration or deceleration.

FIG. 12 illustrates a wheel speed variation which is a change in rotational speed of the tire 7 accompanying acceleration or deceleration as the vehicle is viewed from the traverse direction, and a wheel rotational angular acceleration is denoted by $d\omega_{xy}/dt$, a rotational inertia moment of the tire is denoted by $I_t$, a tire effective turning radius is denoted by R, a braking or driving torque is denoted by T, a tire longitudinal force is denoted by $F_x$, a spring constant of the suspension is denoted by $k_s$ and the a damping coefficient of the suspension is denoted by $c_s$.

A wheel rotational speed $\omega_{xy}$, which is a time integral of the wheel rotational angular acceleration $d\omega_{xy}/dt$ is expressed by the following Formula (23). Incidentally, the wheel rotational speed $\omega_{xy}$ is the wheel slip-induced wheel speed variation caused when an excessive braking or driving torque relative to the tire longitudinal force, which can be generated by the tire, is input at a certain moment. The wheel slip-induced wheel speed variation is estimated based on a tire braking or driving force and the tire longitudinal force. The tire braking or driving torque is detected by an in-vehicle sensor or estimated from a detection value detected by the in-vehicle sensor.

[Formula 23]

$$\omega_{xy} = \int \frac{T - RF_x}{I_t} dt \quad (23)$$

Here, Formula (23) is an example of a method for estimating the wheel slip-induced wheel speed variation $\omega_{xy}$. A gain or a characteristic map that outputs the wheel slip-induced wheel speed variation $\omega_{xy}$ using the braking or driving torque or the like as an input may be used, and the method for estimating the wheel slip-induced wheel speed variation $\omega_{xy}$ is not limited.

Next, the wheel speed variation estimation unit 52*b* estimates and outputs the suspension displacement-induced wheel speed variation caused by the suspension displacement using the vehicle motion state quantity detection value, the driver input quantity detection value, the planar momentum estimation value, the vertical momentum estimation value, and the estimation value of the wheel speed variation estimation unit (induced by the wheel slip) 52*a*.

Front left, front right, rear left, and rear right suspension displacement-induced wheel speed variations $\omega_{zfl}$, $\omega_{zfr}$, $\omega_{zrl}$, and $\omega_{zrr}$ are expressed by the following Formula (24) with variation components of signals of the wheel speed sensors 1 on the front left, front right, rear left, and rear right sides $\omega_{sfl}$, $\omega_{sfr}$, $\omega_{srl}$, and $\omega_{srr}$.

[Formula 24]

$$\begin{cases} \omega_{zfl} = \omega_{sfl} - \omega_{xyfl} = \left\{ \omega_{fl} - \frac{(2V_x - d_f r)\cos\beta_{fl}}{2R_{fl}\cos(\beta_{fl} + \delta)} \right\} - \omega_{xyfl} \\ \omega_{zfr} = \omega_{sfr} - \omega_{xyfr} = \left\{ \omega_{fr} - \frac{(2V_x + d_f r)\cos\beta_{fr}}{2R_{fr}\cos(\beta_{fr} + \delta)} \right\} - \omega_{xyfr} \\ \omega_{zrl} = \omega_{srl} - \omega_{xyrl} = \left( \omega_{rl} - \frac{2V_x - d_r r}{2R_{rl}} \right) - \omega_{xyrl} \\ \omega_{zrr} = \omega_{srr} - \omega_{xyrr} = \left( \omega_{rr} - \frac{2V_x + d_r r}{2R_{rr}} \right) - \omega_{xyrr} \end{cases} \quad (24)$$

Figure 13:
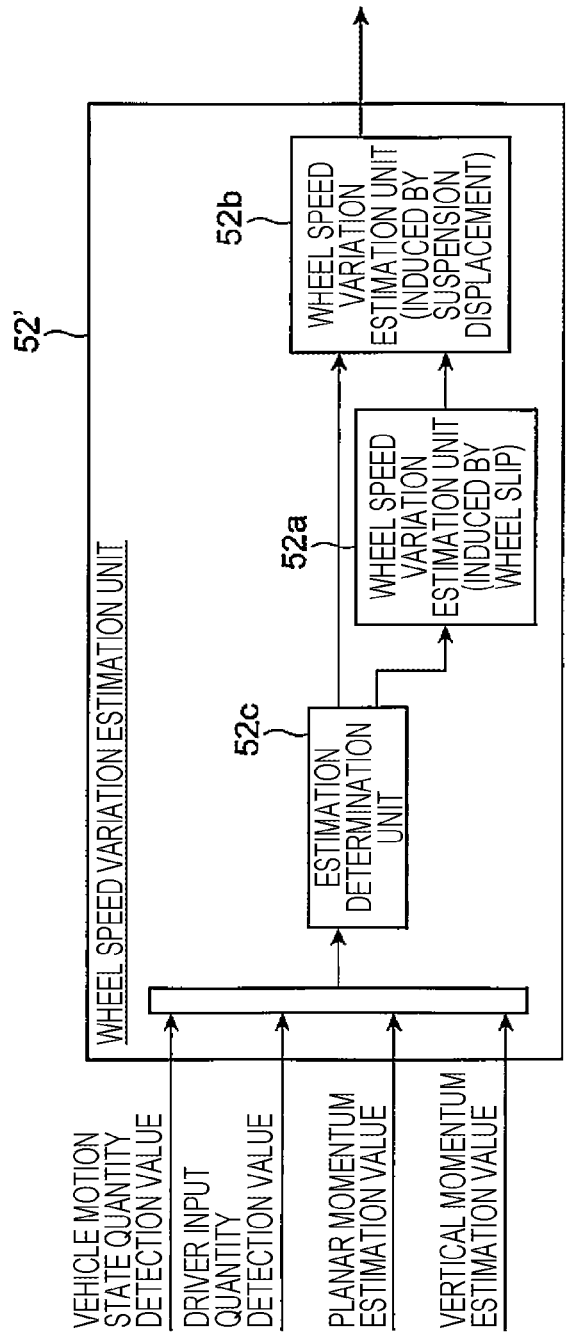
FIG. 13 is a conceptual diagram of a wheel speed variation estimation unit 52' according to the first embodiment.

FIG. 13 is a conceptual diagram of a wheel speed variation estimation unit 52', which is one of the estimation units constituting the vehicle motion state estimation device 50*a* or 50*b*.

A major difference between the wheel speed variation estimation unit 52' in FIG. 13 and the wheel speed variation estimation unit 52 in FIG. 11 is that an estimation determination unit 52*c* is additionally configured.

Figure 14:
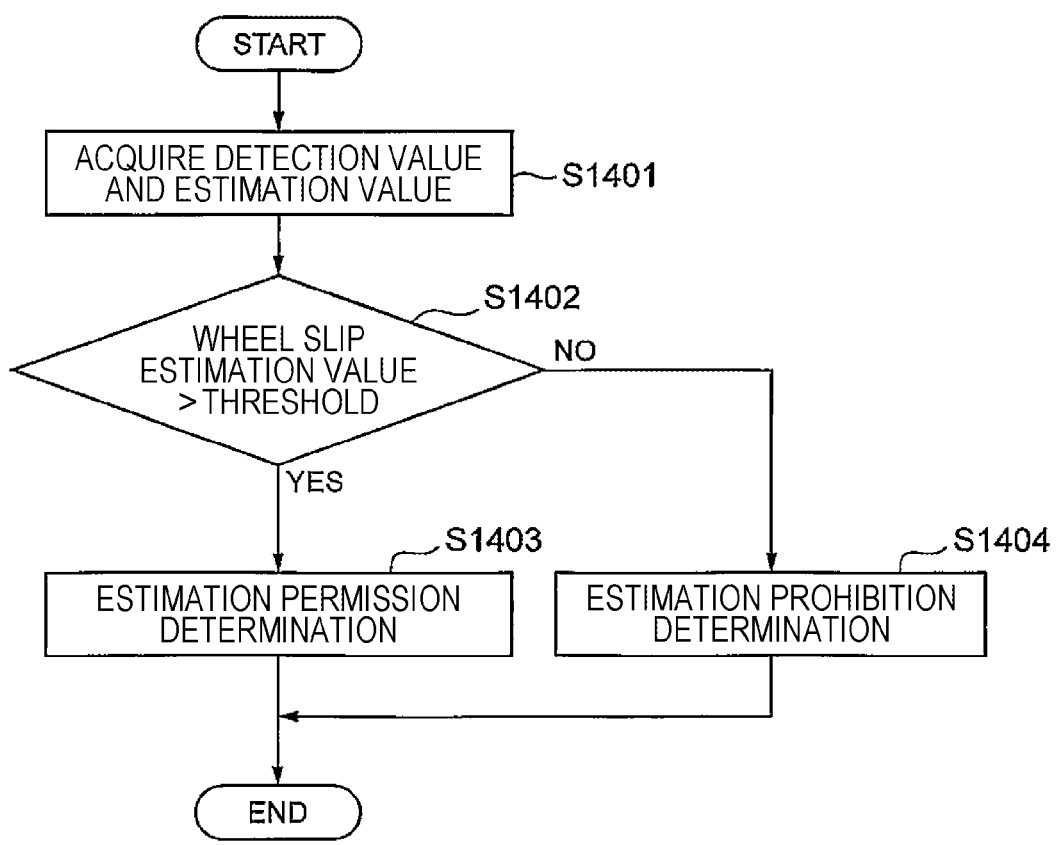
FIG. 14 is a flowchart illustrating estimation determination by the wheel speed variation estimation unit 52' according to the first embodiment.

FIG. 14 is a flowchart illustrating an overview of processing performed by the estimation determination unit 52*c* of the wheel speed variation estimation unit 52'.

First, the estimation determination unit 52*c* acquires the vehicle motion state quantity detection value and the driver input quantity detection value, which are the detection values of the wheel speed sensor and the acceleration sensor, the estimation value of the planar momentum estimation unit 51 or the planar momentum estimation value estimated by the side slip prevention device or the like, and the vertical momentum estimation value which is the estimation value of the vertical momentum estimation unit 53 (step S1401).

Next, it is determined whether a wheel slip acquired in step S1401 is larger than a predetermined threshold (step S1402), the process proceeds to step S1403 to output an estimation permission determination if the wheel slip is larger than the threshold (step S1402, YES), and the process proceeds to step S1404 to output an estimation prohibition determination if the wheel slip is smaller than the threshold (step S1402, NO).

With respect to a result of the estimation determination by the estimation determination unit 52*c*, the wheel speed variation estimation unit (induced by the wheel slip) 52*a* of the wheel speed variation estimation unit 52' performs normal processing in the case of the estimation permission determination, and does not perform the estimation processing in the case of the estimation prohibition determination but performs only processing of defining and outputting zero as the wheel slip-induced wheel speed variation which is output in the normal processing. The wheel slip-induced wheel speed variation is estimated when the wheel slip is larger than the predetermined threshold.

As the permission/prohibition of the estimation process is determined depending on the magnitude of the wheel slip in this manner, it is possible to reduce a calculation load of the vehicle motion state estimation device in a situation where the wheel slip is small, such as during constant-speed traveling, and it is possible to reduce power consumption and heat generation.

The above method is an example of the method for estimating the wheel slip-induced wheel speed variation and the suspension displacement-induced wheel speed variation of the wheel speed variation estimation unit 52 according to the first embodiment, and it is possible to estimate the vertical momentum with higher accuracy as compared with the related art by inputting $\omega_z$ induced by the suspension displacement estimated by the wheel speed variation estimation unit 52 into Formula (1).

Figure 15:
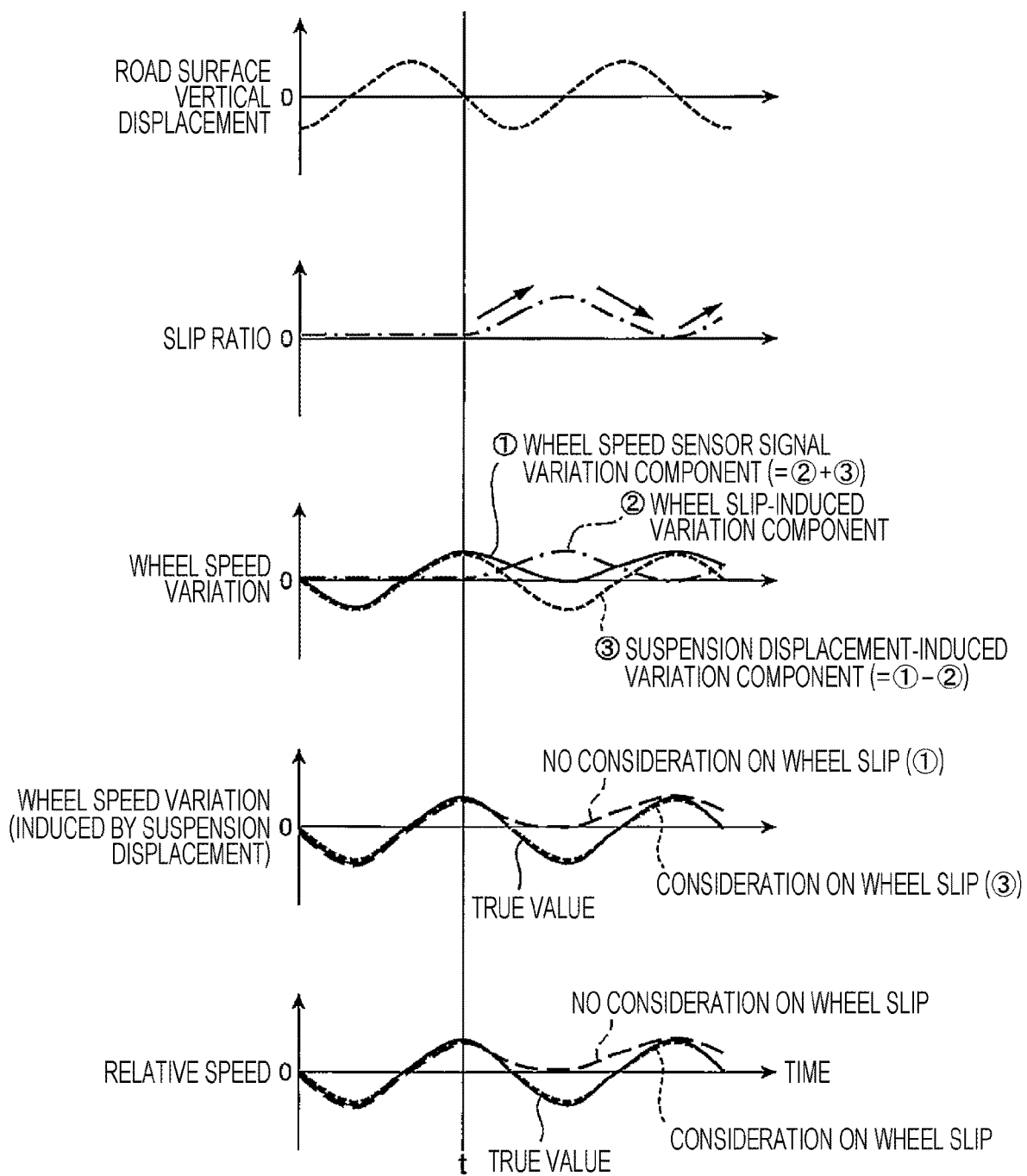
FIG. 15 is a diagram illustrating temporal changes of results of processing performed by the vehicle motion state estimation device 50a or 50b according to the first embodiment.

FIG. 15 is a diagram illustrating temporal changes of a road surface vertical displacement, and the slip ratio, the wheel speed variation, the wheel speed variation (induced by the suspension displacement), and the relative speed which are estimated by the vehicle motion state estimation device 50*a* or 50*b*. The slip ratio, the wheel speed variation and the wheel speed variation (induced by the suspension displacement), and the relative speed are examples of processing results in, respectively, the slip ratio estimation unit 51*d* described in FIG. 7, the wheel speed variation estimation unit 52 or 52' described in FIGS. 12 to 14, and the vertical momentum estimation unit 53 described in FIGS. 1 and 2. Here, it is assumed that the wheel speed variation occurs only by the suspension displacement and the wheel slip.

First, constant-speed traveling is performed with a slip ratio of substantially zero in a period up to time t illustrated in FIG. 15, and a suspension displacement-induced variation component (3) of the wheel speed variation is approximately equal to a wheel speed sensor signal variation component (1).

As a result, relative speed estimation values in the case of not considering the wheel slip (the related art) in which a vertical momentum is estimated based on the wheel speed sensor signal variation component (1) of the wheel speed variation and the case of considering the wheel slip (the present invention) in which a vertical momentum is estimated based on a suspension displacement-induced variation component (3) of the wheel speed variation are approximately equal, and become values close to true values.

Next, acceleration traveling is performed in a period after time t illustrated in FIG. 15, and the wheel slip-induced variation component (2) is generated in the wheel speed variation accompanying the wheel slip caused by acceleration.

The wheel speed sensor signal variation component (1) of the wheel speed variation is expressed by a sum of the wheel slip-induced variation component (2) and the suspension displacement-induced variation component (3), and thus, an estimation error due to the wheel slip occurs between a true value and a relative speed estimation value in the case of not considering the wheel slip (the related art) in which the vertical momentum is estimated based on the wheel speed sensor signal variation component (1) of the wheel speed variation.

On the other hand, it is possible to estimate a relative speed estimation value in the case of considering the wheel slip (the present invention) in which the vertical momentum is estimated based on only the suspension displacement-induced variation component (3) obtained by extracting and removing the wheel slip-induced variation component (2) from the wheel speed sensor signal variation component (1) of the wheel speed variation with higher accuracy as compared with the related art.

Second Embodiment

In a second embodiment, differences from the first embodiment will be described, and the same description as that of the first embodiment will be omitted.

Figure 16:
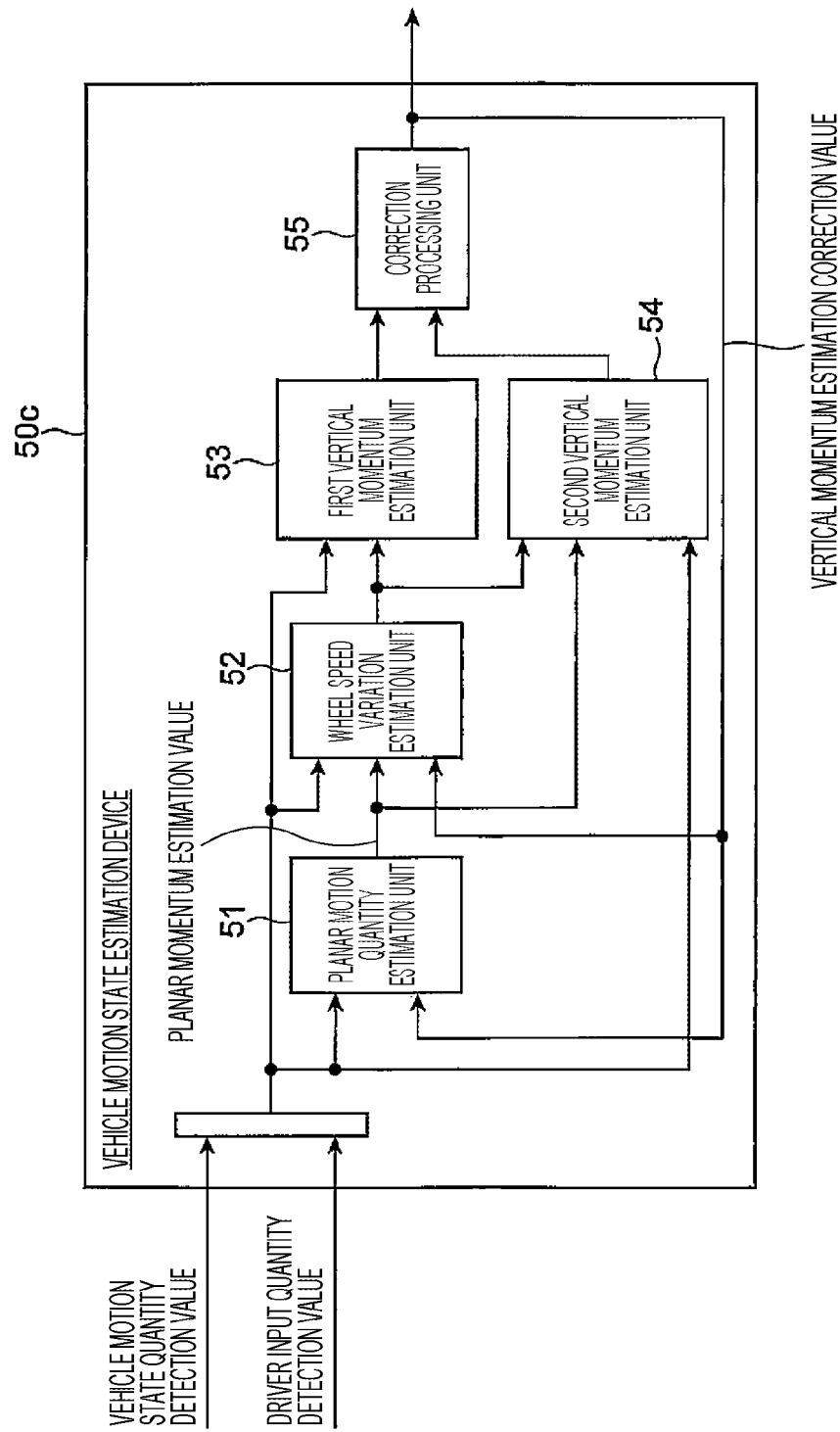
FIG. 16 is a conceptual diagram of a vehicle motion state estimation device 50c according to a second embodiment.
Figure 17:
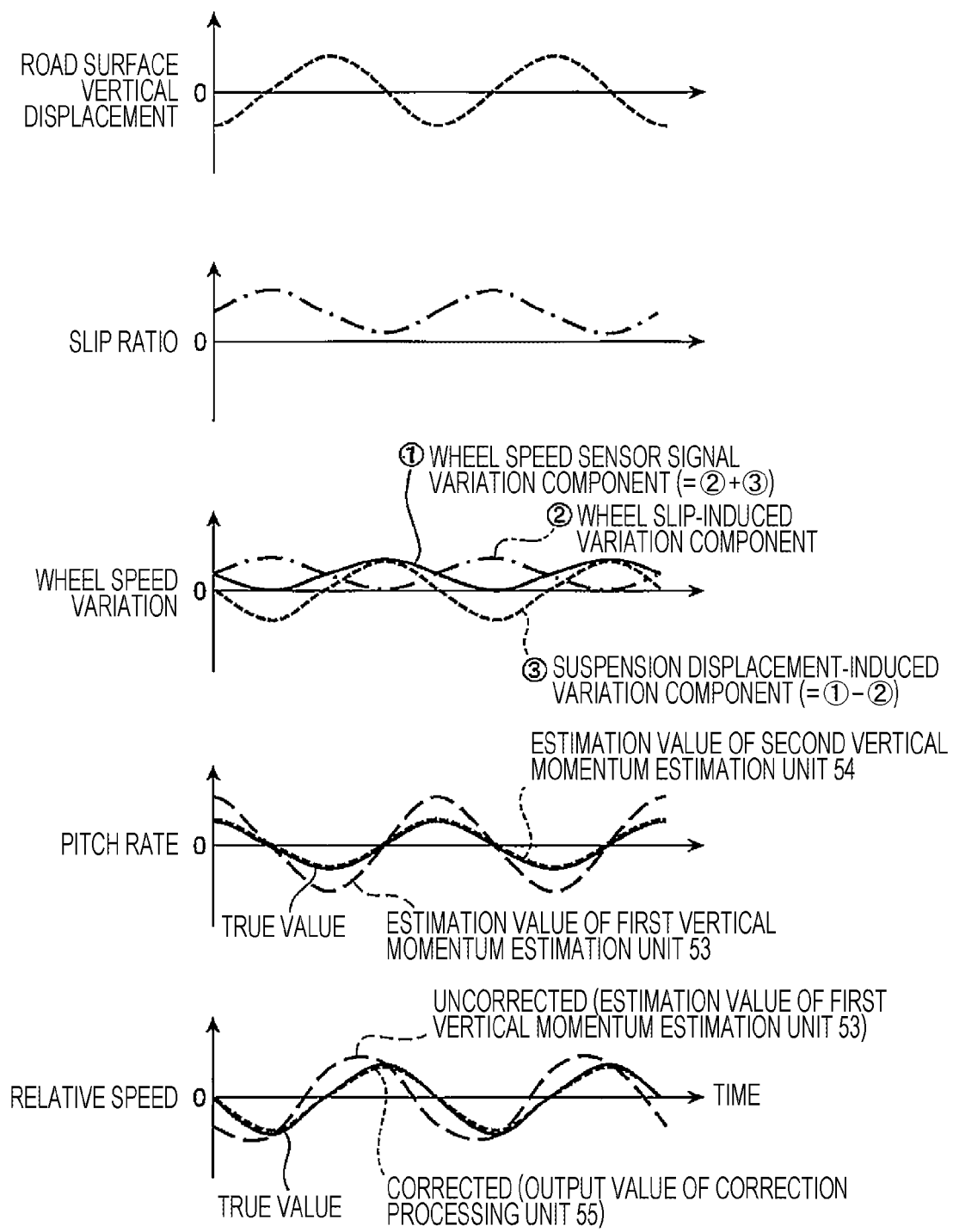
FIG. 17 is a diagram illustrating temporal changes of results of processing performed by the vehicle motion state estimation device 50c according to the second embodiment.

Incidentally, a main difference between the second embodiment and the first embodiment is that a second vertical momentum estimation unit 54 that estimates a vertical momentum in a different method from a first vertical momentum estimation unit 53 (which is the same as the vertical momentum estimation unit 53 of the first embodiment) and a correction processing unit 55 that corrects an estimation value of the first vertical momentum estimation unit 53 based on estimation values of the first vertical momentum estimation unit 53 and the second vertical momentum estimation unit 54 are added, and a processing overview of a vehicle motion state estimation device 50*c* according to the second embodiment will be described with reference to FIGS. 16 and 17.

FIG. 16 is a conceptual diagram of a vehicle motion state estimation device 50*c* that estimates a vertical momentum such as a relative speed and a pitch rate based on a detection value of a wheel speed sensor, an acceleration sensor, or the like.

The vehicle motion state estimation device 50*c* includes the planar momentum estimation unit 51, the wheel speed variation estimation unit 52, the first vertical momentum estimation unit 53, the second vertical momentum estimation unit 54, and the correction processing unit 55.

The second vertical momentum estimation unit 54 estimates and outputs the vertical momentum such as a pitch rate in the different method from the first vertical momentum estimation unit 53 by using a vehicle motion state quantity detection value and a driver input quantity detection value and estimation values of the planar momentum estimation unit 51 and the wheel speed variation estimation unit 52.

As an example of the method for estimating the vertical momentum by the second vertical momentum estimation unit 54, a pitch rate $d\theta_{y2}/dt$ and a roll rate $d_{\theta x2}/dt$ are expressed by the following Formulas (25) and (26) with a pitch correction gain as $J_x$, a roll correction gain as $J_y$, a height from a roll axis to the center of gravity 8 as $h_x$, and a turning lateral acceleration as $G_{yc}$.

[Formula 25]
$$\frac{d\theta_{y2}}{dt} = J_y \int \left\{ \frac{d}{dt}\left(\frac{V_{xfl} + V_{xfr}}{2}\right) - G_x \right\} dt \qquad (25)$$

[Formula 26]
$$\frac{d\theta_{x2}}{dt} = J_x \int \frac{G_y - G_{yc}}{h_x} dt = J_x \int \frac{G_y - V\left(\frac{d\beta}{dt} + r\right)}{h_x} dt \qquad (26)$$

Next, the correction processing unit 55 assumes an estimation value of the second vertical momentum estimation unit 54 as a true value, and calculates and outputs an estimation correction value which is a value obtained by correcting an estimation value of the first vertical momentum estimation unit 53 based on a difference between the estimation values of the first vertical momentum estimation unit 53 and the second vertical momentum estimation unit 54.

As an example of a method for correcting the vertical momentum by the correction processing unit 55, estimation correction values $dz_{bwcfl}/dt$, $dz_{bwcfr}/dt$, $dz_{bwcrl}/dt$, and $dz_{bwcrr}/dt$ of the relative speeds of the sprung and unsprung portions in the suspension on the front left, front right, rear left, and rear right sides are expressed by the following Formula (27) with relative speed estimation values of the sprung and unsprung portions in the suspension on the front left, front right, rear left, and rear right sides obtained by the first vertical momentum estimation unit 53 as $dz_{bwfl}/dt$, $dz_{bwfr}/dt$, $dz_{bwrl}/dt$, and $dz_{bwrr}/dt$ and estimation values of a pitch rate and a roll rate obtained by the first vertical momentum estimation unit 53 as $d\theta_{y1}/dt$ and $d\theta_{x1}/dt$, respectively.

[Formula 27]

$$\begin{cases} \dfrac{dz_{bwcfl}}{dt} = \dfrac{dz_{bwfl}}{dt} + \left\{ -l_f \tan\left(\dfrac{d\theta_{y2}}{dt} - \dfrac{d\theta_{y1}}{dt}\right) + \dfrac{d_f}{2}\tan\left(\dfrac{d\theta_{x2}}{dt} - \dfrac{d\theta_{x1}}{dt}\right) \right\} \\ \dfrac{dz_{bwcfr}}{dt} = \dfrac{dz_{bwfr}}{dt} + \left\{ -l_f \tan\left(\dfrac{d\theta_{y2}}{dt} - \dfrac{d\theta_{y1}}{dt}\right) - \dfrac{d_f}{2}\tan\left(\dfrac{d\theta_{x2}}{dt} - \dfrac{d\theta_{x1}}{dt}\right) \right\} \\ \dfrac{dz_{bwcrl}}{dt} = \dfrac{dz_{bwrl}}{dt} + \left\{ l_r \tan\left(\dfrac{d\theta_{y2}}{dt} - \dfrac{d\theta_{y1}}{dt}\right) + \dfrac{d_r}{2}\tan\left(\dfrac{d\theta_{x2}}{dt} - \dfrac{d\theta_{x1}}{dt}\right) \right\} \\ \dfrac{dz_{bwcrr}}{dt} = \dfrac{dz_{bwrr}}{dt} + \left\{ l_r \tan\left(\dfrac{d\theta_{y2}}{dt} - \dfrac{d\theta_{y1}}{dt}\right) - \dfrac{d_r}{2}\tan\left(\dfrac{d\theta_{x2}}{dt} - \dfrac{d\theta_{x1}}{dt}\right) \right\} \end{cases} \quad (27)$$

The corrected estimation correction values $dz_{bwcfl}/dt$, $dz_{bwcfr}/dt$, $dz_{bwcrl}/dt$, and $dz_{bwcrr}/dt$ of the relative speeds of the sprung and unsprung portions obtained from Formula (27) are time-differentiated or time-integrated and input to Formulas (2) to (10), and another estimation value of the first vertical momentum estimation unit 53 such as a tire vertical force is corrected so that it is possible to estimate the vertical momentum with higher accuracy as compared with the related art.

FIG. 17 is a diagram illustrating temporal changes of a road surface vertical displacement, a slip ratio estimated by the vehicle motion state estimation device 50c, a wheel speed variation, a pitch rate, and a relative speed.

In FIG. 17, a vehicle accelerates and decelerates on a road surface where a vertical displacement cycle is constant, a wheel slip occurs due to acceleration and deceleration, and a wheel slip-induced variation component (2) occurs in the wheel speed variation.

Further, the pitch rate estimation value of the first vertical momentum estimation unit 53 has a larger estimation error than that of the second vertical momentum estimation unit 54, and further, the uncorrected relative speed (the estimation value of the first vertical momentum estimation unit 53) has a large estimation error.

On the other hand, it is possible to estimate the vertical momentum with higher accuracy in the case of using a corrected relative speed (an output value of the correction processing unit 55), obtained by correcting the estimation value of the first vertical momentum estimation unit 53 based on a difference between the estimation values of the first vertical momentum estimation unit 53 and the second vertical momentum estimation unit 54 as compared with the case of using the uncorrected relative speed.

Third Embodiment

In a third embodiment, differences from the second embodiment will be described, and the same description as that of the second embodiment will be omitted.

Incidentally, a major difference between the third embodiment and the second embodiment is that a correction determination unit 56, which determines permission or prohibition of correction of an estimation value of the first vertical momentum estimation unit 53 based on a predicted estimation error of the second vertical momentum estimation unit 54, is added, and a processing overview of the vehicle motion state estimation device 50d according to the third embodiment will be described with reference to FIGS. 18 to 21.

Figure 18:
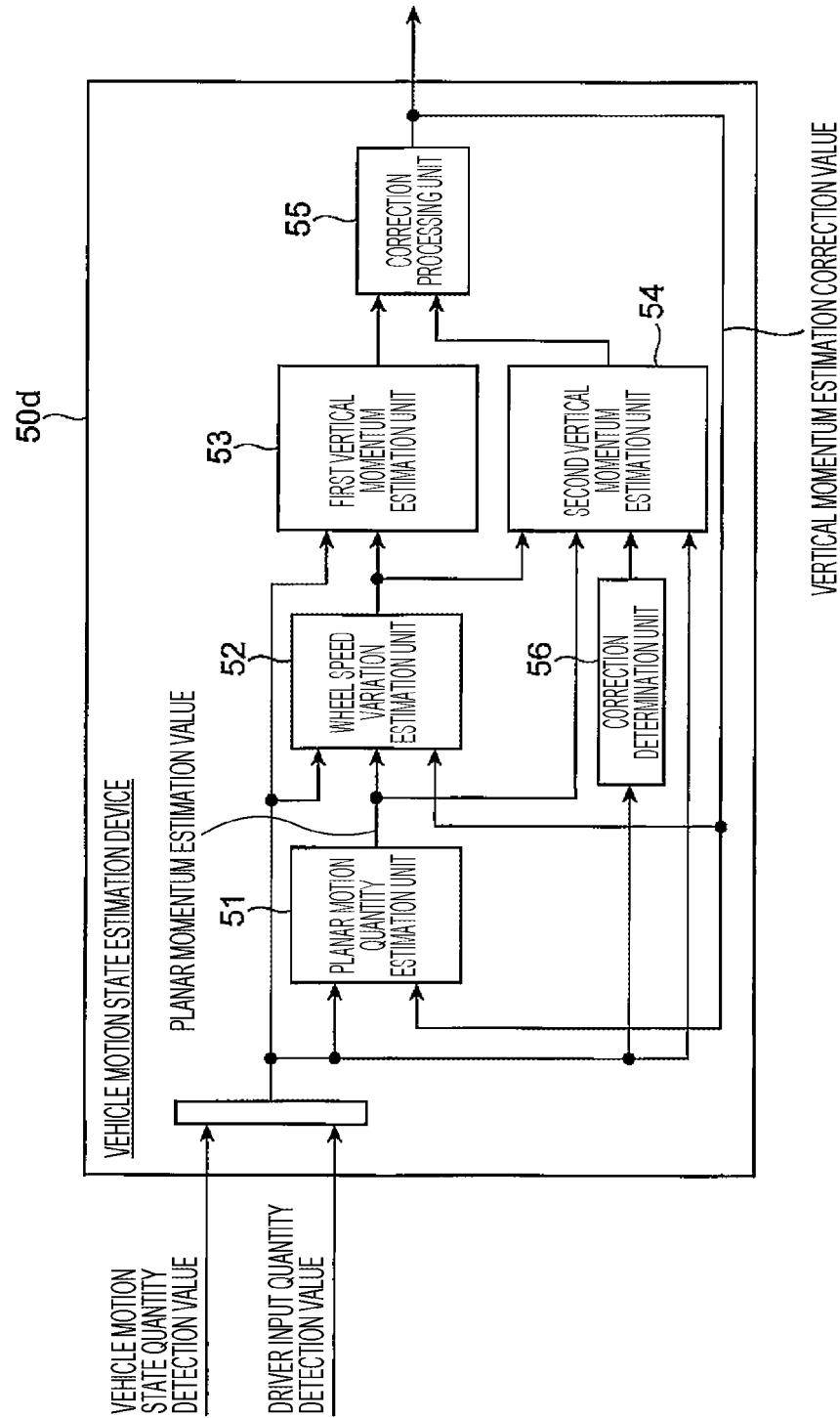
FIG. 18 is a conceptual diagram of a vehicle motion state estimation device 50d according to a third embodiment.

FIG. 18 is a conceptual diagram of a vehicle motion state estimation device 50d that estimates a vertical momentum such as a relative speed and a pitch rate based on a detection value of a wheel speed sensor, an acceleration sensor, or the like.

The vehicle motion state estimation device 50d includes the planar momentum estimation unit 51, the wheel speed variation estimation unit 52, the first vertical momentum estimation unit 53, the second vertical momentum estimation unit 54, the correction processing unit 55, and a correction determination unit 56.

Figure 19:
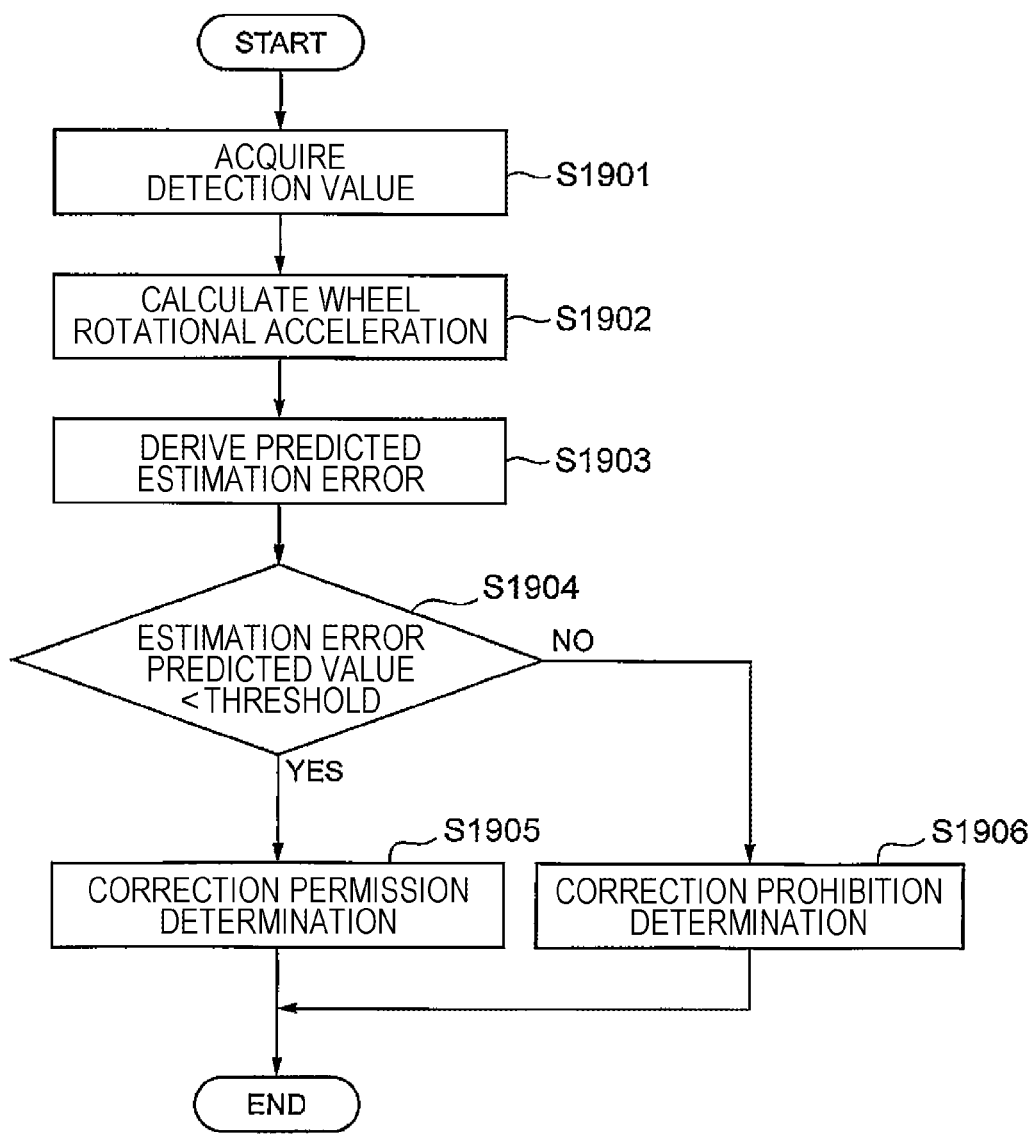
FIG. 19 is a flowchart illustrating correction determination by the vehicle motion state estimation device 50d according to the third embodiment.

FIG. 19 is a flowchart illustrating an overview of processing performed by the correction determination unit 56 of the vehicle motion state estimation device 50d.

First, the correction determination unit 56 acquires a vehicle motion state quantity detection value and a driver input quantity detection value which are detection values of a wheel speed sensor, an acceleration sensor, and the like (step S1901).

Next, a wheel speed sensor signal acquired in step S1901 is time-differentiated to calculate a wheel rotational acceleration (step S1902).

Next, the predicted estimation error of the second vertical momentum estimation unit 54 is derived based on the wheel rotational acceleration calculated in step S1902 (step S1903).

Figure 20:
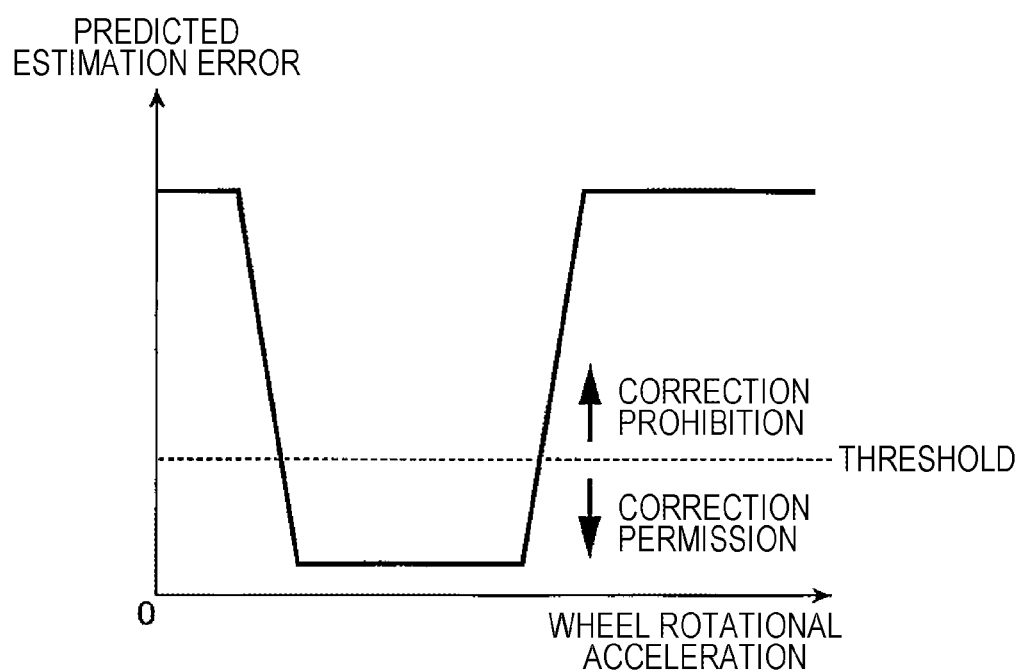
FIG. 20 is a graph illustrating a relationship between a wheel rotational acceleration and a predicted estimation error according to the third embodiment.

Here, the second vertical momentum estimation unit 54 is provided with a characteristic map as illustrated in FIG. 20 in advance, and the wheel rotational acceleration is input to this characteristic map in step S1903 to derive the predicted estimation error (a predicted value of an estimation error) of the second vertical momentum estimation unit 54.

FIG. 20 is a view illustrating a relationship between the wheel rotational acceleration and the predicted estimation error.

The predicted estimation error illustrated in FIG. 20 is the magnitude of an estimation error of a vertical momentum detected in advance by a gyro sensor or the like and estimated by the second vertical momentum estimation unit 54.

Next, it is determined whether the predicted estimation error derived in step S1903 is smaller than a predetermined threshold (step S1904), the process proceeds to step S1905 to output a correction permission determination if the predicted estimation error is smaller than the threshold (step S1904, YES), and the process proceeds to step S1906 to output a correction prohibition determination if the predicted estimation error is larger than the threshold (step S1904, NO). That is, when the predicted value of the estimation error output by the characteristic map is smaller than the predetermined value, the vertical momentum estimated by the first vertical momentum estimation means is corrected.

With respect to a correction determination result by the correction determination unit 56, the second vertical momentum estimation unit 54 of the vehicle motion state estimation device 50d performs normal processing in the case of the correction permission determination, and does not perform the estimation processing in the case of the correction prohibition determination but performs only processing of defining and outputting zero as the pitch rate or the like which is output in the normal processing.

As whether to permit or prohibit the correction process is determined in accordance with the predicted estimation error of the second vertical momentum estimation unit 54 in this manner, it is possible to suppress deterioration of estimation accuracy caused by the correction.

Figure 21:
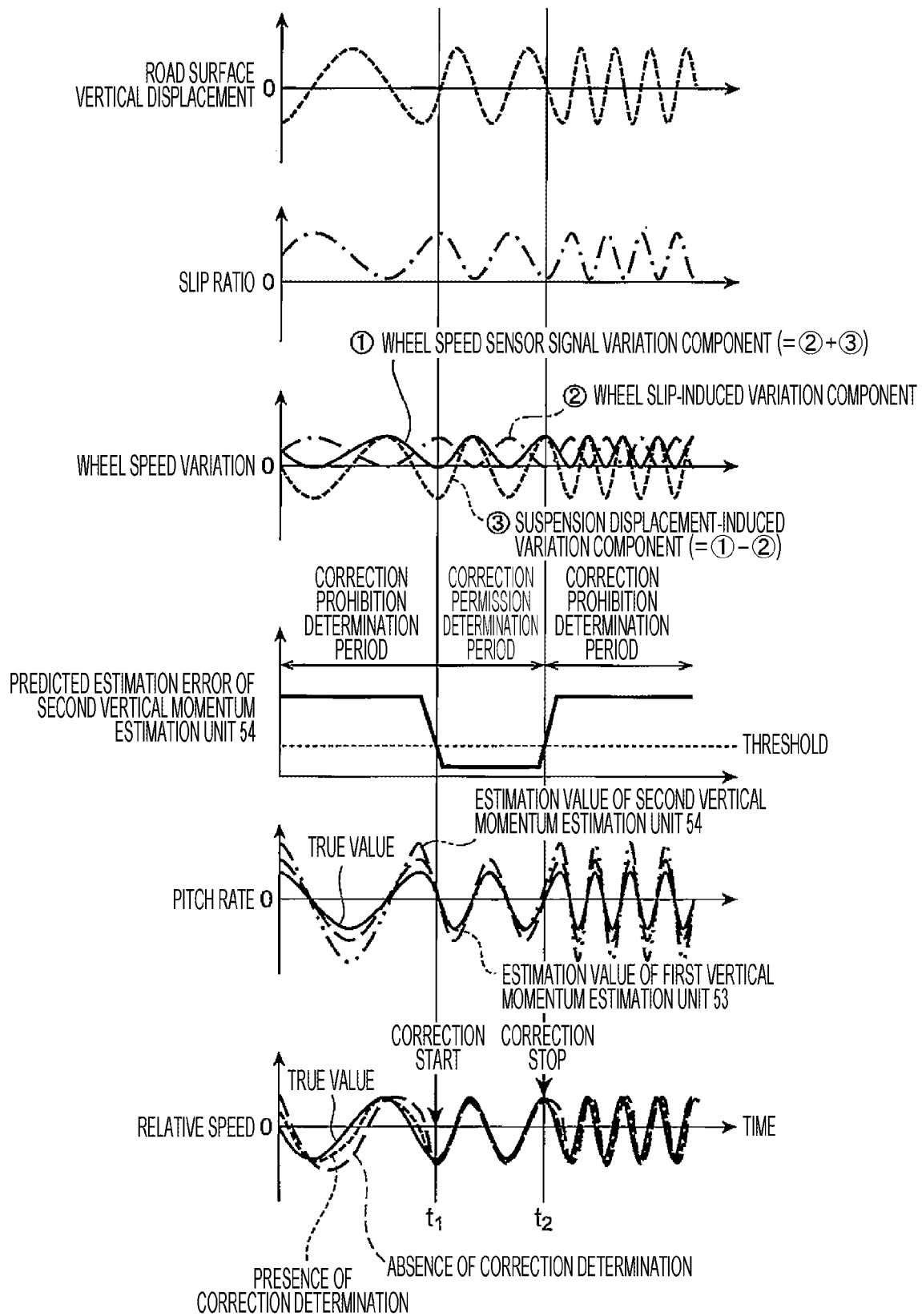
FIG. 21 is a diagram illustrating temporal changes of results of processing performed by the vehicle motion state estimation device 50d according to the third embodiment.

FIG. 21 is a diagram illustrating temporal changes of a road surface vertical displacement, a slip ratio estimated by the vehicle motion state estimation device 50*d*, a wheel speed variation, the predicted estimation error of the second vertical momentum estimation unit 54, a pitch rate, and a relative speed.

In FIG. 21, a vehicle accelerates and decelerates on a road surface where a vertical displacement cycle changes, a wheel slip occurs due to acceleration and deceleration, and a wheel slip-induced variation component (2) occurs in the wheel speed variation.

Further, the predicted estimation error of the second vertical momentum estimation unit 54 is larger than the threshold in a period up to time t1 and a period after time t2 illustrated in FIG. 21, an estimation error of a pitch rate estimation value of the second vertical momentum estimation unit 54 is larger than that of the first vertical momentum estimation unit 53, and a relative speed estimation value in the case where there is no correction determination by the correction determination unit 56 has a large estimation error.

On the other hand, an estimation error of a relative speed estimation value in the case where there is the correction determination is smaller than that of the relative speed estimation value in the case where there is no correction determination in a correction prohibition determination period, and enables estimation of the vertical momentum constantly with higher accuracy than that in the case where there is no correction determination.

Fourth Embodiment

In a fourth embodiment, differences from the first to third embodiments will be described, and the same description as that of the first to third embodiments will be omitted.

Incidentally, a major difference of the fourth embodiment from the first to third embodiments is that a vehicle 10*b* is configured by adding a suspension control unit 81 and a control suspension device 82 to the vehicle 10*a* according to the first to third embodiments, and a processing overview of the suspension control unit 81 according to the fourth embodiment will be mainly described with reference to FIGS. 22 to 24. Further, a vehicle motion state estimation device according to the fourth embodiment may be any one of the vehicle motion state estimation device 50*a* or 50*b* of the first embodiment, the vehicle motion state estimation device 50*c* of the second embodiment, and the vehicle motion state estimation device 50*d* of the third embodiment.

Figure 22:
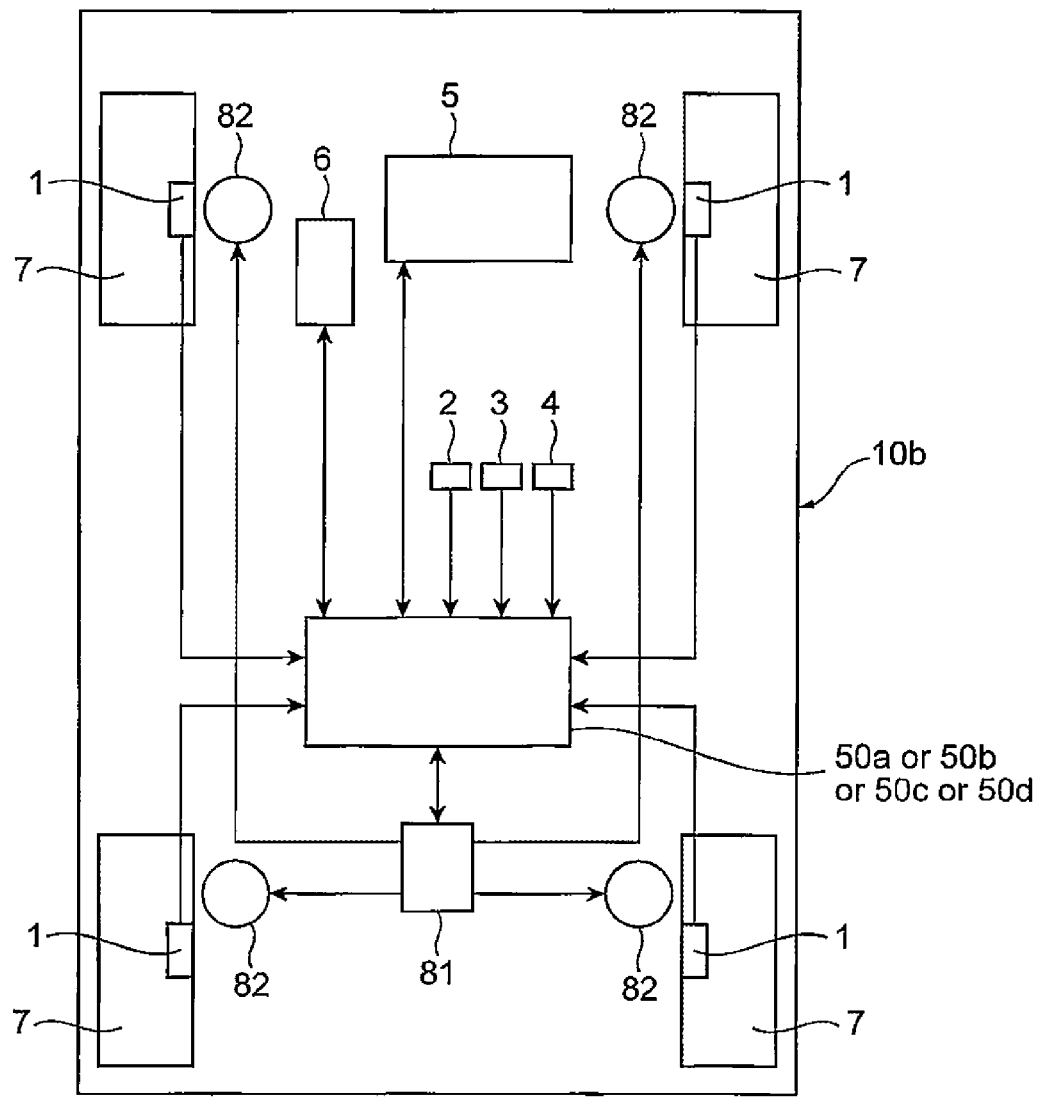
FIG. 22 is a diagram illustrating a vehicle configuration in which the vehicle motion state estimation device 50a, 50b, 50c, or 50d is mounted according to a fourth embodiment.

FIG. 22 illustrates a configuration diagram of the vehicle 10*b* equipped with the vehicle motion state estimation device 50*a*, 50*b*, 50*c*, or 50*d* according to the fourth embodiment.

FIG. 22 illustrates a configuration in which the suspension control unit 81 and the control suspension device 82 are added to FIG. 6.

The control suspension device 82 is a damping force adjustment-type shock absorber capable of adjusting a damping characteristic or an active suspension capable of adjusting a force in the vertical direction between a vehicle body and a wheel.

The suspension control unit 81 generates a control signal to control the damping characteristic of the control suspension device 82 or the force in the vertical direction based on a detection value of an acceleration sensor, a gyro sensor, or the like and an estimation value such as a sprung vertical speed estimated by the vehicle motion state estimation device 50*a*, 50*b*, 50*c*, or 50*d*.

Next, as an example of the control using the suspension control unit 81, a processing overview of riding comfort control will be described with reference to FIG. 23.

Figure 23:
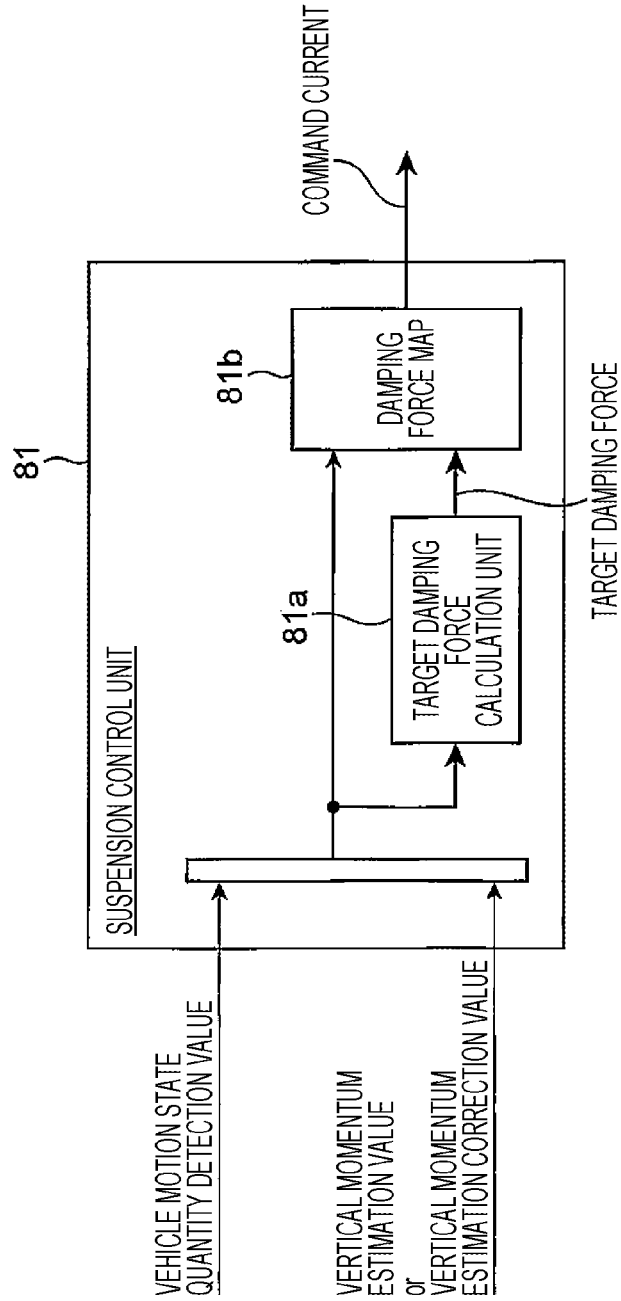
FIG. 23 is a conceptual diagram of a suspension control unit 81 according to the fourth embodiment.

FIG. 23 is a conceptual diagram of the suspension control unit 81 that performs the riding comfort control which is one function of the control suspension device 82 according to the fourth embodiment.

A vehicle motion state quantity detection value detected by an acceleration sensor or a gyro sensor, and a vertical momentum estimation value estimated by the vehicle motion state estimation device 50*a* or 50*b* or a vertical momentum estimation correction value estimated by the vehicle motion state estimation device 50*c* or 50*d* are input to the suspension control unit 81.

The suspension control unit 81 includes a target damping force calculation unit 81*a* and a damping force map 81*b*.

The target damping force calculation unit 81*a* calculates a target damping force of the control suspension device 82 based on the vehicle motion state quantity detection value and the vertical momentum estimation value or the vertical momentum estimation correction value.

The damping force map 81*b* is map information on characteristics of the control suspension device 82 stored in advance, and uses the target damping force calculated by the target damping force calculation unit 81*a* and the vehicle motion state quantity detection value as inputs to derive and output a command current to control the control suspension device 82.

Figure 24:
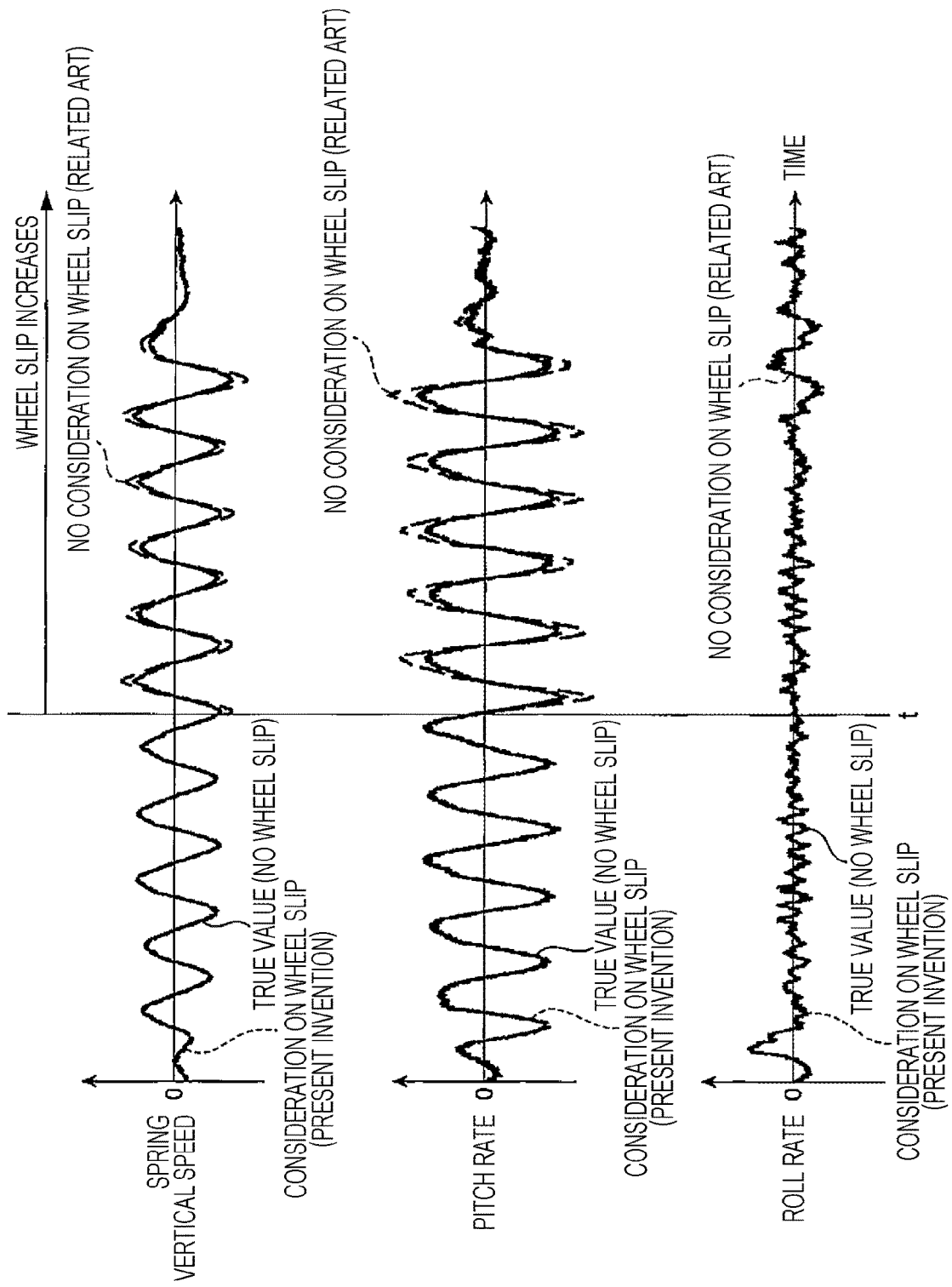
FIG. 24 is a diagram illustrating temporal changes of results of processing performed by the suspension control unit 81 according to the fourth embodiment.

FIG. 24 illustrates an example of a result of processing performed by the suspension control unit 81 according to the fourth embodiment.

FIG. 24 is a diagram illustrating temporal changes of a sprung vertical speed, a pitch rate, and a roll rate which are results obtained by comparing influence on the riding comfort between presence and absence of consideration on a wheel slip in a long wave path where the wheel slip increases after time t using a processing result under a condition that the wheel slip is substantially zero as a true value.

As illustrated in FIG. 24, in the case where there is consideration on the wheel slip (the present invention), a sprung vertical speed and a pitch rate are low and approximately equal to true values as compared with the case where there is no consideration on the wheel slip (the related art) in which a vertical momentum is estimated based on a variation component of a wheel speed sensor signal including a wheel slip-induced wheel speed variation so that it is possible to improve the riding comfort as compared with the related art.

With the above configuration, it is possible to extract only a suspension displacement-induced wheel speed variation and generate the command current to control a suspension based on the estimated vertical momentum even when the wheel slip occurs, and thus, it is possible to realize the high-performance suspension control as compared with the case of using the variation component of the wheel speed sensor signal including the wheel slip-induced wheel speed variation in the related art.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. Further, configurations of another embodiment can be substituted for some configurations of a certain embodiment, and further, a configuration of another embodiment can be added to a configuration of a certain embodiment. Further, addition, deletion, or substitution of other configurations can be made with respect to some configurations of each embodiment.

REFERENCE SIGNS LIST 1 wheel speed sensor
2 acceleration sensor
3 gyro sensor
4 steering angle sensor
5 drive control unit
6 brake control unit
7 tire
8 gravity center
10a, 10b vehicle
50a, 50b, 50c, 50d vehicle motion state estimation device
51 planar momentum estimation unit
51a wheel speed conversion unit
51b vehicle body longitudinal speed estimation unit
51c road surface friction coefficient estimation unit
51d slip ratio estimation unit
51e side slip angle estimation unit
51f tire longitudinal force estimation unit
52, 52' wheel speed variation estimation unit
52a wheel speed variation estimation unit (induced by wheel slip)
52b wheel speed variation estimation unit (induced by suspension displacement)
52c estimation determination unit
53 vertical momentum estimation unit, first vertical momentum estimation unit
54 second vertical momentum estimation unit
55 correction processing unit
56 correction determination unit
81 suspension control unit (suspension control device)
81a target damping force calculation unit
81b damping force map
82 control suspension device

The invention claimed is:

1. A vehicle motion state estimation device comprising:
a plurality of sensors including a wheel speed sensor, an acceleration sensor, a gyro sensor, and a steering angle sensor, the vehicle motion state estimation device configured to
estimate a wheel slip-induced wheel speed variation caused by wheel slips in longitudinal and lateral directions,
estimate a suspension displacement-induced wheel speed variation caused by a displacement of a suspension based on a wheel speed sensor signal and the wheel slip-induced wheel speed variation, and
estimate a vertical momentum of a vehicle based on the suspension displacement-induced wheel speed variation, and
a suspension control device configured to receive information from the plurality of sensors and to use a damping force map to perform suspension control of the vehicle.

2. The vehicle motion state estimation device according to claim 1, wherein
the wheel slip-induced wheel speed variation is estimated when the wheel slip is larger than a predetermined value.

3. The vehicle motion state estimation device according to claim 1, wherein
the wheel slip is estimated from position information of the vehicle by a GPS.

4. The vehicle motion state estimation device according to claim 1, wherein the vertical momentum, estimated by the vehicle motion state estimation device, is input to the suspension control device, the suspension control device controlling the estimated vertical momentum via a damping force of the suspension.

5. The vehicle motion state estimation device according to claim 1, wherein
the wheel slip-induced wheel speed variation is estimated based on a tire braking or driving torque and a tire longitudinal force.

6. The vehicle motion state estimation device according to claim 5, wherein
the tire braking or driving torque is detected by at least one of the plurality of sensors or estimated from a detection value detected by at least one of the plurality of sensors.

7. The vehicle motion state estimation device according to claim 5, wherein
the tire longitudinal force is estimated based on a road surface friction coefficient estimated from a detection value of at least one of the plurality of sensors, the wheel slip, and a tire vertical force.

8. The vehicle motion state estimation device according to claim 5, wherein
the tire longitudinal force is estimated by an external device connected to an outside of the vehicle motion state estimation device.

9. The vehicle motion state estimation device according to claim 1, comprising:
a first vertical momentum estimation means for estimating the wheel slip-induced wheel speed variation caused by the wheel slips in the longitudinal and lateral directions, estimating the suspension displacement-induced wheel speed variation caused by the displacement of the suspension based on the wheel speed sensor signal and the wheel slip-induced wheel speed variation, and estimating the vertical momentum of the vehicle based on the suspension displacement-induced wheel speed variation; and
a second vertical momentum estimation means for estimating the vertical momentum using a method different from the first vertical momentum estimation means,
wherein the vertical momentum estimated by the first vertical momentum estimation means is corrected based on a difference between the vertical momentum estimated by the first vertical momentum estimation means and the vertical momentum estimated by the second vertical momentum estimation means.

10. The vehicle motion state estimation device according to claim 9, wherein
a characteristic map which outputs a predicted value of an estimation error of the second vertical momentum estimation means is provided in advance so as to correct the vertical momentum estimated by the first vertical momentum estimation means when the predicted value of the estimation error output from the characteristic map is smaller than a predetermined value.

* * * * *